(12) United States Patent
Lee et al.

(10) Patent No.: US 10,795,442 B2
(45) Date of Patent: Oct. 6, 2020

(54) METHOD OF PROVIDING VIBRATION AND ELECTRONIC DEVICE FOR SUPPORTING SAME

(71) Applicant: Samsung Electronics Co., Ltd., Gyeonggi-do (KR)

(72) Inventors: Won Jun Lee, Gyeonggi-do (KR); Sun Young Yi, Gyeonggi-do (KR); Ji Won Kim, Gyeonggi-do (KR); Young Hak Oh, Gyeonggi-do (KR); Yong Gu Lee, Gyeonggi-do (KR); Kyu Ok Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 14 days.

(21) Appl. No.: 16/197,607

(22) Filed: Nov. 21, 2018

(65) Prior Publication Data
US 2019/0155389 A1    May 23, 2019

(30) Foreign Application Priority Data

Nov. 22, 2017   (KR) .......................... 10-2017-0156452

(51) Int. Cl.
*G06F 3/01* (2006.01)
*H04M 1/725* (2006.01)
(Continued)

(52) U.S. Cl.
CPC ............ *G06F 3/016* (2013.01); *G06F 1/1632* (2013.01); *G06T 7/20* (2013.01); *H04M 1/026* (2013.01); *H04M 1/72544* (2013.01)

(58) Field of Classification Search
USPC ........................................................ 345/156
See application file for complete search history.

(56) References Cited

U.S. PATENT DOCUMENTS

| 2003/0067440 A1* | 4/2003 | Rank ................... A63F 13/5255 |
| | | 345/156 |
| 2004/0193079 A1* | 9/2004 | Siddhartha ............. A61H 19/50 |
| | | 601/72 |

(Continued)

FOREIGN PATENT DOCUMENTS

| EP | 2 921 212 A1 | 9/2015 |
| EP | 3 179 440 A1 | 6/2017 |

(Continued)

OTHER PUBLICATIONS

International Search Report dated Feb. 28, 2019.

*Primary Examiner* — Chineyere D Wills-Burns
(74) *Attorney, Agent, or Firm* — Cha & Reiter, LLC.

(57) ABSTRACT

Disclosed is an electronic device including: a communication interface; at least one first vibration device; and a processor, wherein the processor is configured to determine vibration information including a first time for vibrating the at least one first vibration device and a second time for vibrating at least one second vibration device included in an external device to which the electronic device is mounted, based at least partially on information included in content to be outputted by the electronic device, transmit, through the communication interface, at least part of the vibration information to the external device such that the external device vibrates the at least one second vibration device based at least partially on the second time, and control the at least one first vibration device to vibrate based at least partially on the first time while the content is outputted.

20 Claims, 24 Drawing Sheets

(51) Int. Cl.
   *G06F 1/16*   (2006.01)
   *G06T 7/20*   (2017.01)
   *H04M 1/02*   (2006.01)
   *H04M 19/04*  (2006.01)

(56) References Cited

U.S. PATENT DOCUMENTS

| | | |
|---|---|---|
| 2010/0073304 A1 | 3/2010 | Grant et al. |
| 2010/0331082 A1 | 12/2010 | Kim et al. |
| 2011/0006888 A1 | 1/2011 | Bae et al. |
| 2011/0128132 A1* | 6/2011 | Ullrich .................. G06F 3/16 340/407.1 |
| 2011/0157049 A1 | 6/2011 | Lee et al. |
| 2012/0242462 A1* | 9/2012 | Nagara ................ G06F 1/1632 340/407.1 |
| 2013/0265286 A1* | 10/2013 | Da Costa ............. G06F 3/016 345/177 |
| 2014/0173155 A1* | 6/2014 | Slattery ............ G06F 13/4081 710/303 |
| 2014/0176432 A1* | 6/2014 | Park ..................... G06F 3/042 345/156 |
| 2014/0333553 A1* | 11/2014 | Yun ..................... G06F 3/0416 345/173 |
| 2015/0253851 A1* | 9/2015 | Oh ..................... G06F 3/04883 345/179 |
| 2015/0323993 A1* | 11/2015 | Levesque .............. G06F 3/017 345/156 |
| 2016/0062514 A1* | 3/2016 | Jo ........................ G06F 3/012 345/174 |
| 2016/0063850 A1* | 3/2016 | Yang ..................... G08B 23/00 340/539.22 |
| 2016/0085076 A1* | 3/2016 | Hoellwarth .......... G02B 27/022 455/566 |
| 2016/0116982 A1* | 4/2016 | Baek ................... H04N 9/8205 345/156 |
| 2016/0187988 A1* | 6/2016 | Levesque ............ F16M 11/043 345/156 |
| 2018/0178120 A1* | 6/2018 | Kyuma .................. A63F 13/24 |

FOREIGN PATENT DOCUMENTS

| | | |
|---|---|---|
| KR | 10-2011-0074329 A | 6/2011 |
| KR | 10-2015-0090524 A | 8/2015 |
| KR | 10-2016-0039175   | 4/2016 |
| KR | 10-2016-0049687 A | 5/2016 |

* cited by examiner

METHOD OF PROVIDING VIBRATION AND ELECTRONIC DEVICE FOR SUPPORTING SAME

CROSS-REFERENCE TO RELATED APPLICATION(S)

This application is based on and claims priority under 35 U.S.C. § 119 to Korean Patent Application No. 10-2017-0156452, filed on Nov. 22, 2017, in the Korean Intellectual Property Office, the disclosure of which is incorporated by reference herein in its entirety.

BACKGROUND

1) Field

The present disclosure generally relates to a method of providing vibration and an electronic device for supporting the same.

2) Description of Related Art

Electronic devices, such as portable smart phones, may provide various functions such as a call function, a message transmission/reception function, a multimedia reproduction function, and a game function. In providing these various functions, the electronic devices may output various vibration as well as images and sounds.

Electronic devices may also provide various functions together with other electronic devices. For example, electronic devices may provide a virtual reality function or an augmented reality function when the electronic devices are mounted to a Head-Mounted Device (HMD). In another example, electronic devices may provide a game function using a game pad or a game controller that is communicatively connected to the electronic devices.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure relate to a method of providing vibration and an electronic device for supporting the same. The electronic device may provide vibration related to content together with an external device when the electronic device is mounted to the external device.

The technical subjects pursued in the present disclosure may not be limited to the above mentioned technical subjects, and other technical subjects which are not mentioned may be clearly understood, through the following descriptions, by those skilled in the art of the present disclosure.

In accordance with an aspect of the present disclosure, an electronic device is provided. The electronic device includes: a communication interface; at least one first vibration device; and a processor, wherein the processor is configured to determine vibration information including a first time for vibrating the at least one first vibration device and a second time for vibrating at least one second vibration device included in an external device to which the electronic device is mounted, based at least partially on information included in content to be outputted by the electronic device, transmit, through the communication interface, at least part of the vibration information to the external device such that the external device vibrates the at least one second vibration device based at least partially on the second time, and control the at least one first vibration device to vibrate based at least partially on the first time while the content is outputted.

In accordance with another aspect of the present disclosure, a method of providing vibration by an electronic device having a communication interface is provided. The method includes: determining vibration information including a first time for vibrating the at least one first vibration device included in the electronic device and a second time for vibrating at least one second vibration device included in an external device to which the electronic device is mounted, based at least partially on information included in content to be outputted by the electronic device; transmitting, through the communication interface, at least part of the vibration information to the external device such that the external device vibrates the at least one second vibration device based at least partially on the second time; and controlling the at least one first vibration device to vibrate based at least partially on the first time while the content is outputted.

A method of providing vibration according to various embodiments of the present disclosure and an apparatus for supporting the same can provide vibration related to content together with an external device when the electronic device is mounted to the external device. In addition, the electronic device together with the external device may provide directivity for the vibration. Thus, the user may feel more immersed in the content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
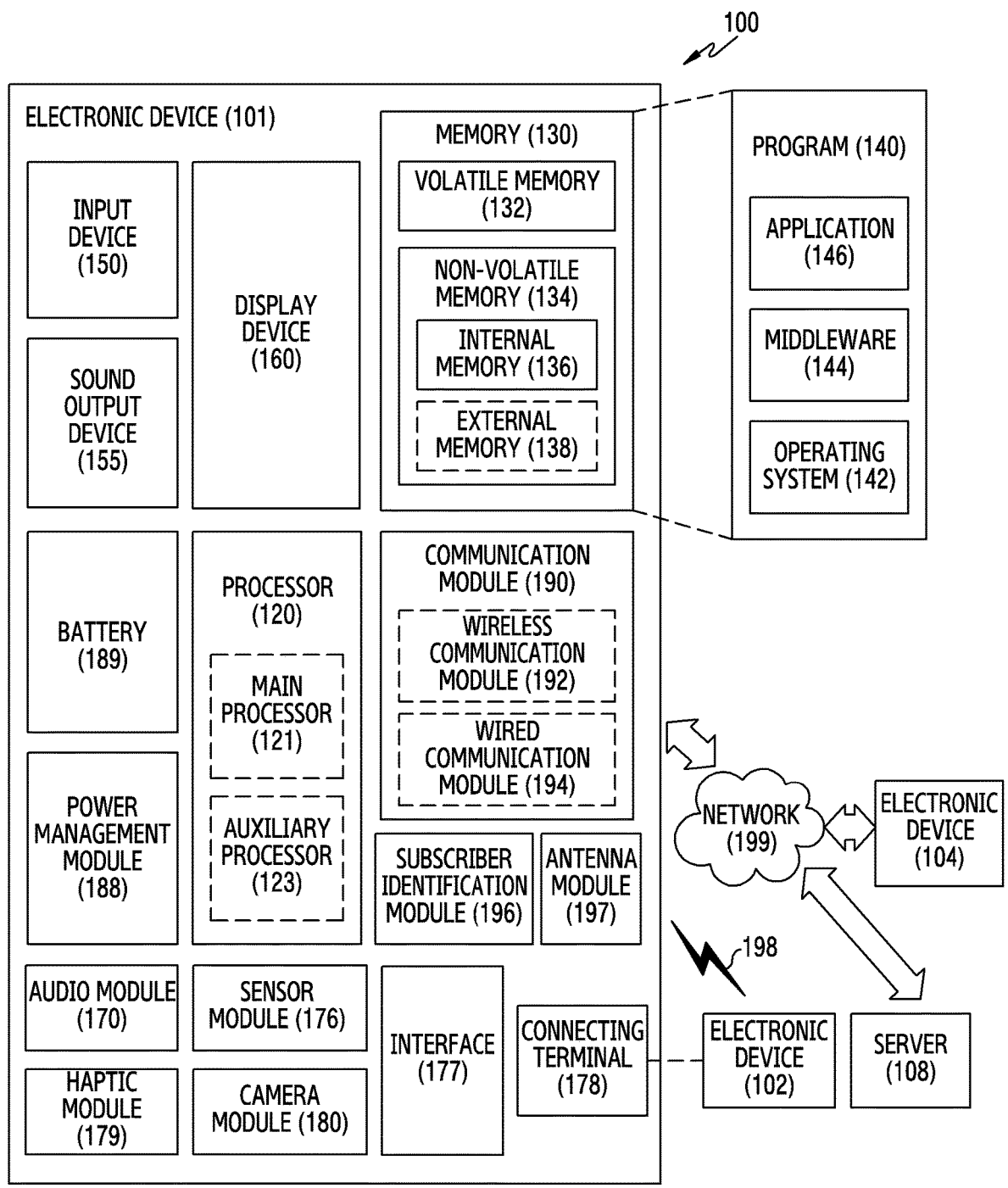
FIG. 1 is a block diagram illustrating an electronic device with a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments of the present disclosure is not limited to the above-described devices.

Figure 2:
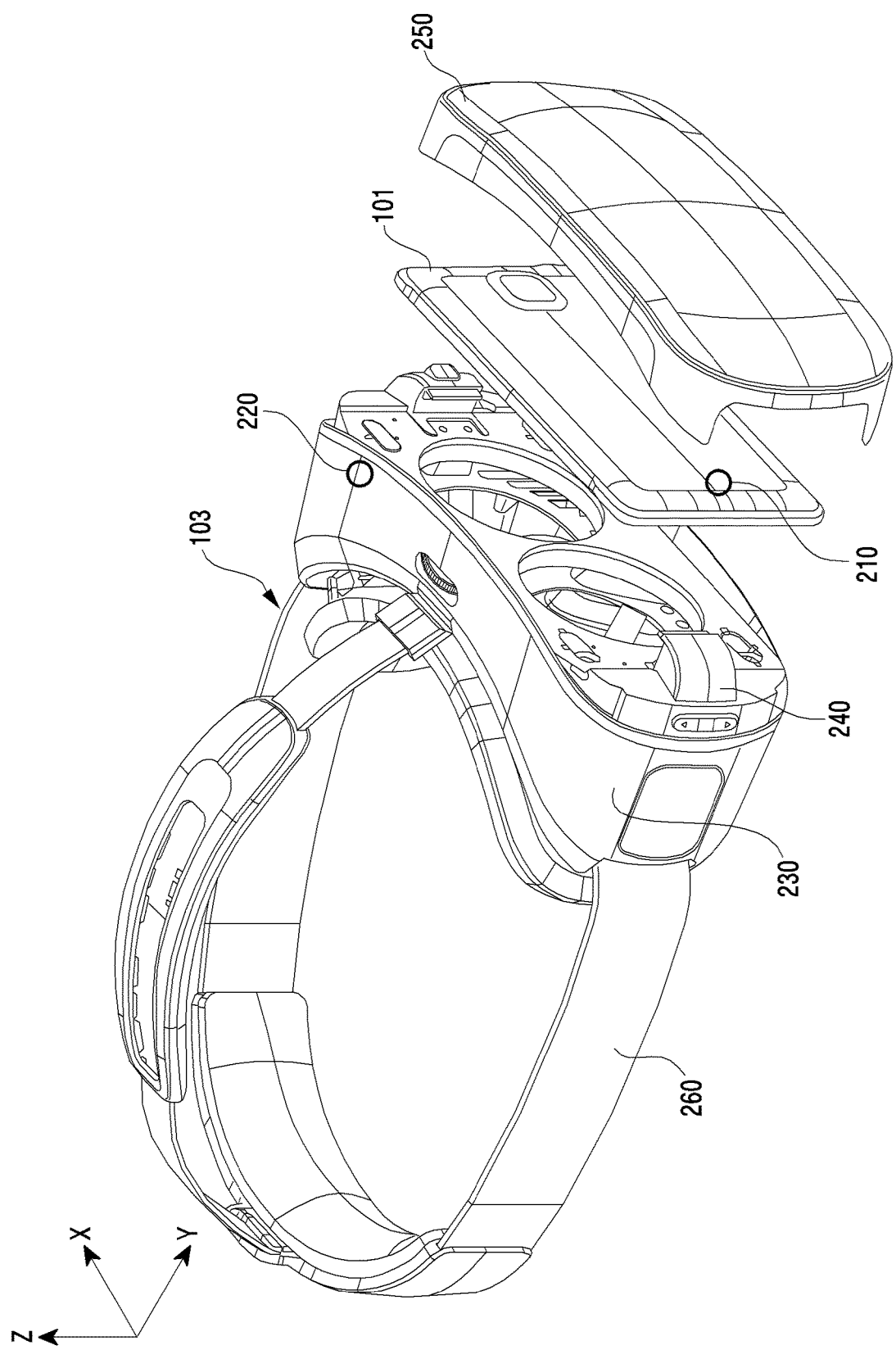
FIG. 2 is a perspective view of an electronic device and a HMD, according to an embodiment of the present disclosure.

FIG. 2 is a perspective view of an electronic device and a HMD, according to an embodiment of the present disclosure.

For example, using FIG. 2, a method by which the electronic device 101 and the HMD 103 provides vibration together when the electronic device 101 is mounted to (combined with, attached to, or worn on) the HMD 103 may be illustrated. FIG. 2 illustrates the HMD 103 as an external device to which the electronic device 101 is mounted, but the HMD 103 is not limited thereto.

According to an embodiment, the electronic device 101 may communicate with the HMD 103 through the communication module 190 when the electronic device 101 is mounted to the HMD 103. According to an embodiment, the electronic device 101 may transmit/receive information related to vibration by communicating with the HMD 103 through a wire (for example, a wire having a Universal Serial Bus (USB) connector) or wirelessly (for example, through a Bluetooth connection). According to an embodiment, through the communication module 190, the electronic device 101 may transmit information related to vibration to the HMD 103 so that the HMD 103 operates a vibration device (a vibrator or an actuator) included in the HMD 103.

According to an embodiment, when the electronic device 101 is mounted to the HMD 103, the electronic device 101 causes the user to feel a direction of vibration through a vibration device (hereinafter, the vibration device included in the electronic device 101 is referred to as a "first vibration device" and the vibration device included in the external device (for example, the HMD 103) is referred to as a "second vibration device"). In causing the user to feel the direction of the vibration, the electronic device 101 may provide (or transfer) directivity of vibration to the user. The electronic device 101 may cause the user to feel directivity of vibration by generating a sequence of vibrations using the first vibration device 210 and the second vibration device 220. For example, the first vibration device 210 and the second vibration device 220 may vibrate at different times. For example, when the second vibration device 220 vibrates at a predetermined amount of time after the first vibration device 210 vibrates, the electronic device 101 may provide the user with a vibration effect to cause the user to feel directivity of vibration from a location of the first vibration device 210 to a location of the second vibration device 220. However, the directivity of vibration that the user feels may vary depending on a direction in which at least one of the first vibration device 210 and the second vibration device 220 actually vibrates. For example, as explained in detail in connection with FIG. 4, when the first vibration device 210 and the second vibration device 220 vibrate along the z axis shown in FIG. 2, directivity of vibration parallel to the x axis may be provided to the user. In another example, when the first vibration device 210 vibrates within a predetermined amount of time after the second vibration device 220 vibrates, the electronic device 101 may provide the user with a vibration effect such that the user feels directivity from the location of the second vibration device 220 to the location of the first vibration device 210.

Hereinafter, vibration provided to (i.e. felt by) the user through different vibration sequences of the first vibration device 210 and the second vibration device 220 is referred to as a "vibration effect" and a direction of vibration provided to the user by the vibration effect is referred to as a "direction of the vibration effect." According to an embodiment, the direction of the vibration effect may be different from the direction of actual vibration generated by the electronic device and, hereinafter, the direction in which the vibration device actually vibrates is referred to as a "vibration direction" in order to distinguish the "direction of the vibration effect" from the direction in which the electronic device actually vibrates.

According to an embodiment, the first vibration device 210 may be included in the haptic module 179 of FIG. 1.

According to an embodiment, the vibration direction of the first vibration device 210 may be the same as the vibration direction of the second vibration device 220. For example, the first vibration device 210 and the second vibration device 220 may vibrate in the same axis (for example, x axis) direction.

According to another embodiment, the vibration direction of the first vibration device 210 may be different from the vibration direction of the second vibration device 220. For example, the first vibration device 210 may vibrate on one axis (for example, x axis) direction and the second vibration device 220 may vibrate on another axis (for example, y axis) direction.

According to an embodiment, the direction of the vibration effect may be determined by vibration sequences of the first vibration device 210 and the second vibration device 220 regardless of whether the vibration direction of the first vibration device 210 is the same as the vibration direction of the second vibration device 220.

According to an embodiment, the electronic device 101 may provide content when the electronic device 101 is mounted to the HMD 103. For example, the electronic device 101 may provide content through at least one of a function for providing Augmented Reality (AR) where the user's external surroundings are visible on the screen of the electronic device 101 and another function for providing Virtual Reality (VR) where the user's external surroundings are not visible on the screen. Instead, in VR mode, only computer-generated imagery is displayed on the screen.

According to an embodiment, the electronic device 101 may output pre-acquired content. For example, the electronic device 101 may output a recorded image, such as multimedia data. According to another embodiment, the electronic device 101 may output content acquired in real time. For example, the electronic device 101 may output in real time (or immediately or as soon as possible) content acquired in real time through the camera module 180 included in the electronic device 101 or content received in real time from an external device (for example, an external camera).

According to an embodiment, the electronic device 101 may output a vibration effect at least partially on the basis of the content.

According to an embodiment, the electronic device 101 may output a vibration effect at least partially on the basis of images included in the content. For example, when a moving image included in the displayed content includes a moving object (hereinafter, referred to as a "moving object"), the electronic device 101 may output a vibration effect corresponding to the movement of the moving object (or a movement direction of the moving object). More specifically, when the electronic device 101 outputs a moving image including an object moving from the left to the right of the image, the electronic device 101 may vibrate the first vibration device 210 within a predetermined amount of time after the second vibration device 220 vibrates while the moving image is output in order to provide a left to the right direction of the vibration effect.

According to an embodiment, the electronic device 101 may output an image (for example, an omnidirectional (or amnidirectional) image (or a 360-degree image) including an image area (e.g. a part of the omnidirectional image) displayed according to the Point Of View (POV) of the user. The image area can be changed according to the change in the POV. According to an embodiment, when the moving object is included in the omnidirectional image but not entirely included in the image area corresponding to the POV that is currently displayed, the electronic device 101 may output a vibration effect of inducing the user to change his or her POV so that the image area includes the moving object.

According to an embodiment, the electronic device 101 may output a vibration effect at least partially on the basis of a sound included in the content. For example, when the sound to be output is a sound which can provide directivity from one direction to another direction to the user, the electronic device 101 may output a vibration effect according to the direction of the sound (hereinafter, referred to as a "sound direction").

For example, when the electronic device 101 includes a plurality of speakers such as a first speaker and a second speaker and outputs a second sound through the second speaker disposed in the right of the electronic device 101 within a predetermined amount of time after outputting a first sound through the first speaker disposed in the left of the electronic device 101, the electronic device 101 may vibrate the first vibration device 210 within a predetermined amount of time after vibrating the second vibration device 220 while the sound is output in order to provide the user with the direction of the vibration effect from the left to the right of the electronic device 101 (or the −X axis direction in FIG. 2).

However, while it has been described that the sound is output through the plurality of speakers including the first speaker and the second speaker in the above example, the present disclosure is not limited thereto. For example, when the electronic device 101 includes a single speaker and the sound to be output has left to right directivity, the electronic device 101 may vibrate the second vibration device 220 and then vibrate the first vibration device 210 within a predetermined amount of time after vibration of the second vibration device 220 while the sound is output. According to an embodiment, when the electronic device 101 includes a single speaker, the electronic device 101 may identify directivity of the sound beam by identifying at least one of a gain and a phase of the sound signal. When the directivity of the beam moves from the left to the right of the user, the electronic device 101 may vibrate the second vibration device 220 and then vibrate the first vibration device 210 within a predetermined amount of time after vibration of the second vibration device 220 while the sound is output.

According to an embodiment, the electronic device 101 may determine at least one of a length of time of vibration (or a length of time during which a vibration effect is provided), a magnitude of vibration, and a vibration frequency as well as vibration sequences (or vibration start time) of the first vibration device 210 and the second vibration device 220 at least partially on the basis of the content to be output. For example, when the content to be output is a sound, the electronic device 101 may determine the length of time during which the vibration device vibrates while the sound is output. The electronic device 101 may determine the magnitude of vibration (for example, maximum magnitude of vibration) of the first vibration device 210 and the second vibration device 220 to correspond to the volume of the sound. The electronic device 101 may determine the frequency of vibration at least partially on the basis of the frequencies of the sound. The operation in which the electronic device 101 determines these various parameters of the vibration will be described below in more detail.

According to an embodiment, the HMD 103 may include a connector 240 connected to a connector of the electronic device 101 to allow for communication between the electronic device 101 and the HMD 103, and may further include a frame 230 for receiving the electronic device, a cover 250 configured to cover the electronic device 101 and to fix the electronic device 101 to the frame when the electronic device 101 is mounted, and a mounting unit 260 coupled to the frame and configured to fix the HMD 103 to a body part of the user. However, the elements included in the HMD 103 are not limited thereto, and the HMD 103 may further include additional elements or may omit some of the elements illustrated in FIG. 2.

Hereinafter, a method of providing vibration will be described in more detail with reference to FIGS. 2 to 15.

FIGS. 3A to 3E illustrate a method of providing a vibration effect through operations of vibration devices according to an embodiment of the present disclosure.

Referring to FIGS. 3A to 3E, vibration patterns 311, 313, 315, 317, and 319 may correspond to vibration patterns of the first vibration device 210 and vibration patterns 321, 323, 325, 327, and 329 may correspond to vibration patterns of the second vibration device 220.

Figure 3A:
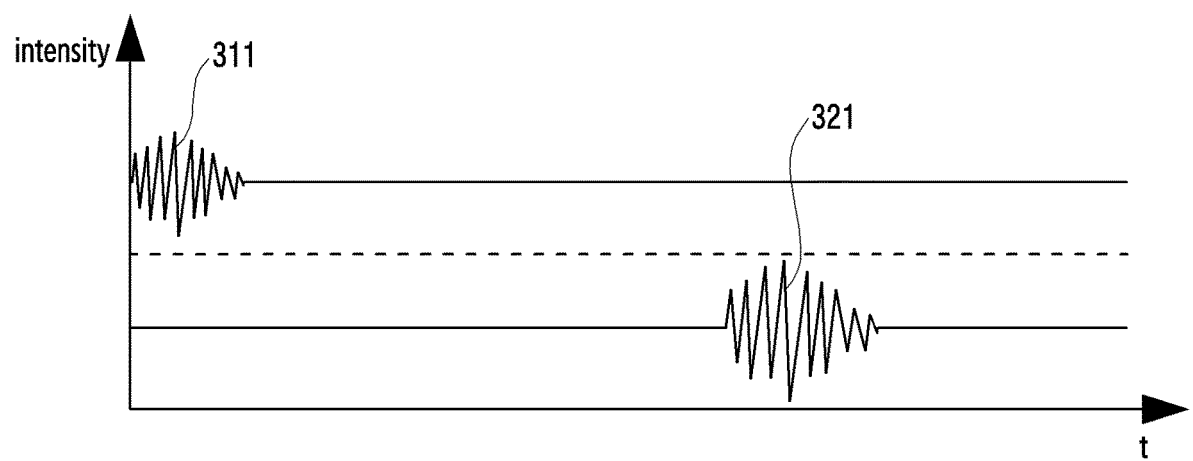
FIG. 3A, FIG. 3B, FIG. 3C, FIG. 3D, and FIG. 3E illustrate a method of providing a vibration effect through operations of vibration devices according to an embodiment of the present disclosure.

According to an embodiment, in FIG. 3A, when the second vibration device 220 vibrates with a vibration intensity and during a vibration time, such as the vibration pattern 321 within a predetermined amount of time after the first vibration device 210 vibrates with a vibration intensity and during a vibration time, such as the vibration pattern 311, a vibration effect having a direction from a location of the first vibration device 210 to a location of the second vibration device 220 may be provided. However, the vibration patterns of the first vibration device 210 and the second vibration device 220 are not limited to those illustrated in FIG. 3A.

Figure 3B:
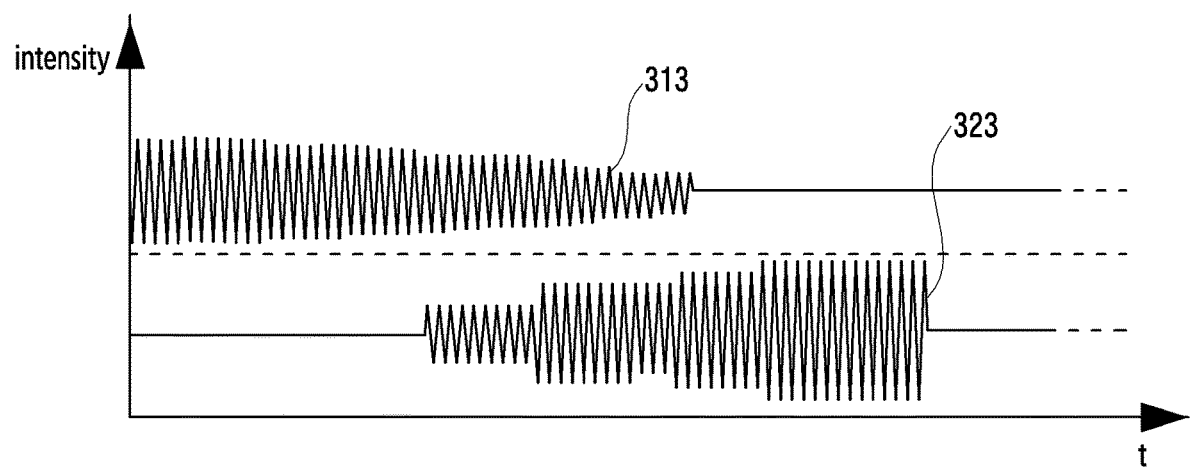

According to an embodiment, in FIG. 3B, when the second vibration device 220 vibrates with an intensity that gradually increases in time, such as the vibration pattern 323, within a predetermined amount of time after the first vibration device 210 vibrates with an intensity that gradually decreases in time, such as the vibration pattern 313, a continuous vibration effect may be provided in a direction from the location of the first vibration device 210 to the location of the second vibration device 220.

Figure 3C:
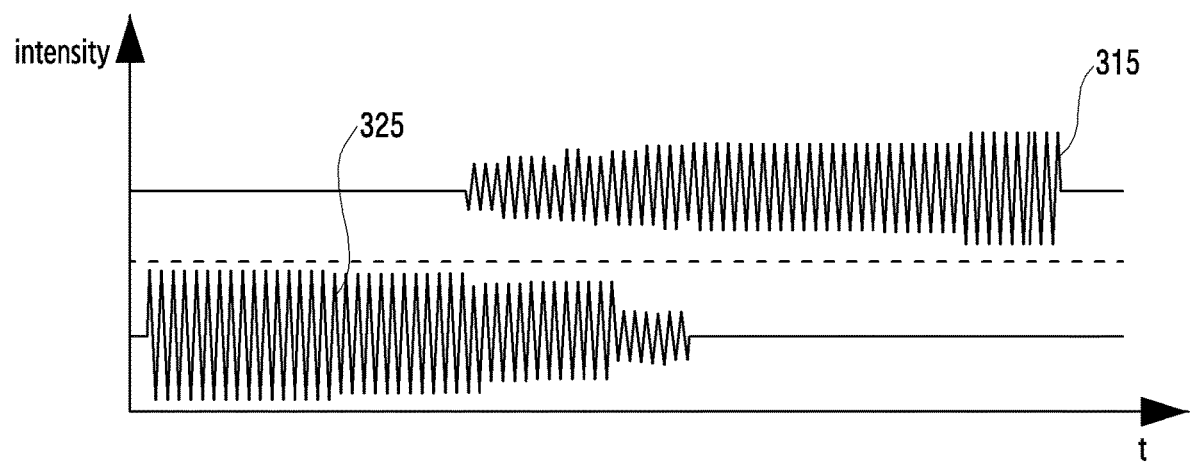

According to an embodiment, in FIG. 3C, when the first vibration device 210 vibrates with an intensity that gradually increases in time, such as the vibration pattern 315, within a predetermined amount of time after the second vibration device 220 vibrates with an intensity that gradually decreases in time, such as the vibration pattern 325, a continuous vibration effect may be provided in a direction from the location of the second vibration device 220 to the location of the first vibration device 210.

Figure 3D:
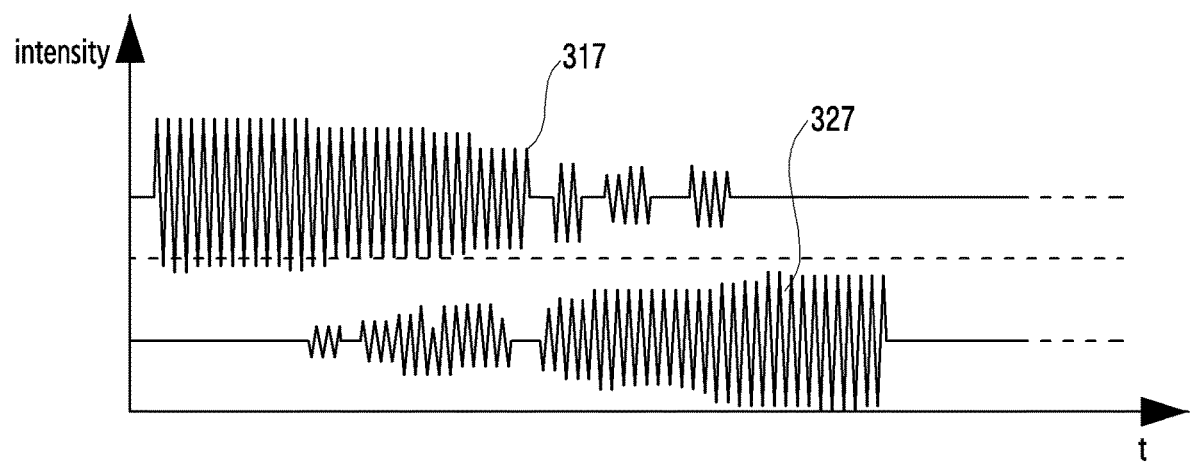

According to an embodiment, in FIG. 3D, when the second vibration device 220 vibrates with an intensity that gradually increases in time while the vibration is interrupted at a plurality of points, such as the vibration pattern 327, within a predetermined amount of time after the first vibration device 210 vibrates with an intensity that gradually decreases in time while the vibration is interrupted at a plurality of points, such as the vibration pattern 317, a multistage (or stepwise) vibration effect may be provided in a direction from the location of the first vibration device 210 to the location of the second vibration device 220.

Figure 3E:
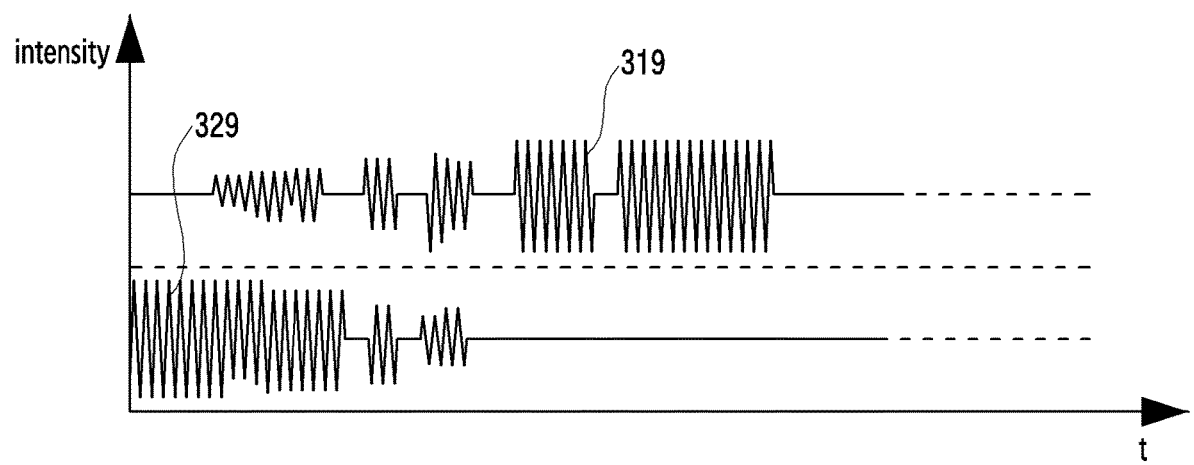

According to an embodiment, in FIG. 3E, when the first vibration device 210 vibrates with an intensity that gradually increases in while the vibration is interrupted at a plurality of points, such as the vibration pattern 319, within a predetermined amount of time after the second vibration device 220 vibrates with an intensity that gradually decreases in time while the vibration is interrupted at a plurality of points, such as the vibration pattern 329, a multistage vibration effect may be provided in a direction from the location of the second vibration device 220 to the location of the first vibration device 210.

It is described that the direction of the vibration effect is the direction from the location of one vibration device to the location of another vibration device in FIG. 3, but the present disclosure is not limited thereto. For example, when the vibration devices are linear vibration devices using a vibration power distribution control method and the vibration devices vibrate parallel to the same axis, a vibration effect may be provided in a direction perpendicular to the vibration direction of the vibration devices. Hereinafter, detailed operations thereof will be described with reference to FIG. 4.

Figure 4:
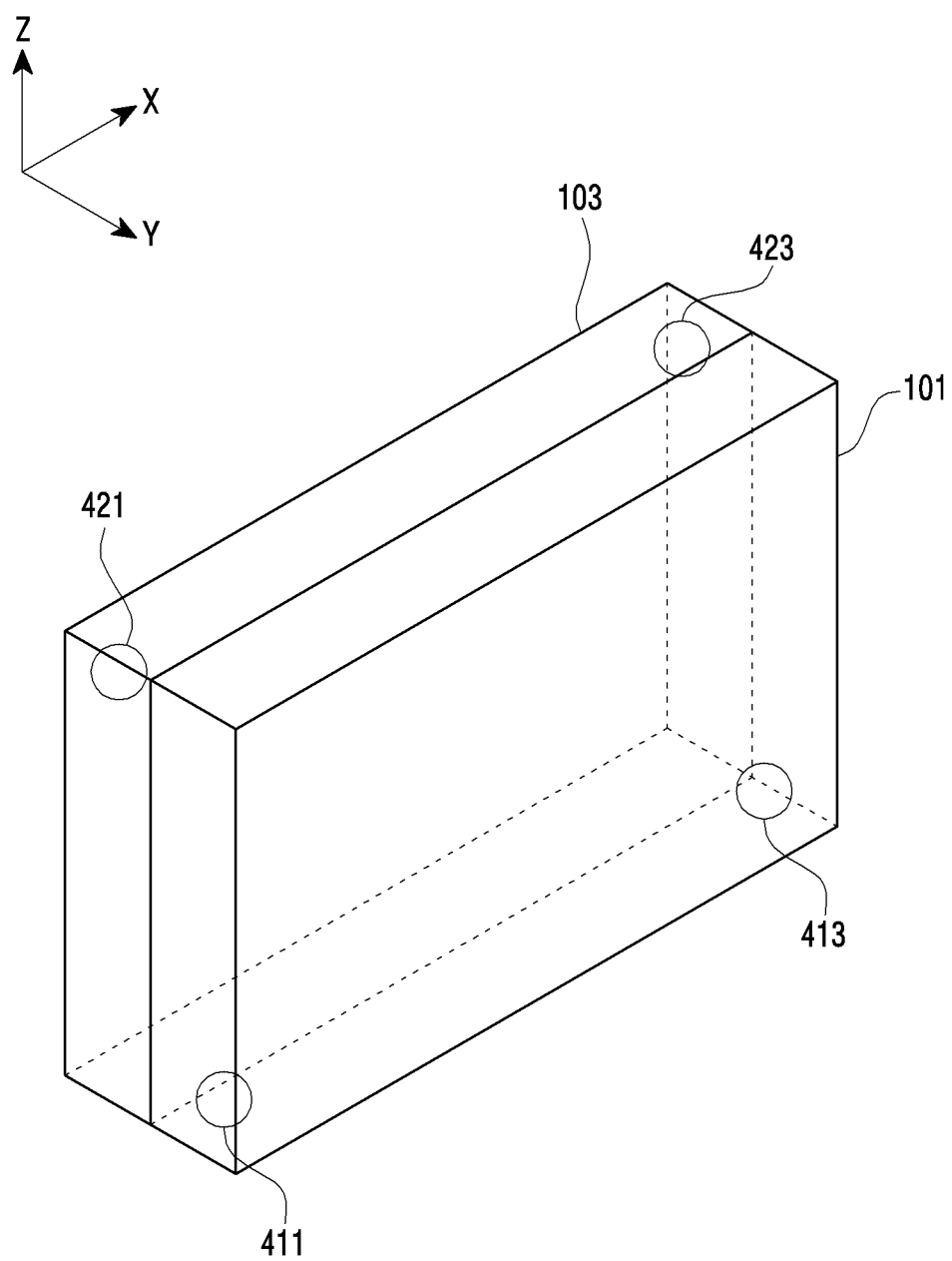
FIG. 4 illustrates a method of providing a vibration effect through the operation of a plurality of linear vibration devices according to an embodiment of the present disclosure.

FIG. 4 illustrates a method of providing a vibration effect through the operation of a plurality of linear vibration devices according to an embodiment of the present disclosure.

Referring to FIG. 4, the electronic device 101 may include a vibration device 411 and a vibration device 413, and the HMD 103 may include a vibration device 421 and a vibration device 423. In FIG. 4, the electronic device 101 and the HMD 103 may be abstracted as blocks. According to an embodiment, the vibration devices 411 to 423 may correspond to linear vibration devices using a vibration power distribution control method. In FIG. 4, it is assumed that the vibration device 411 and the vibration device 423 vibrate along the z axis, and the vibration device 421 and the vibration device 413 vibrate the x axis.

According to an embodiment, when the vibration device 423 vibrates along the z axis within a predetermined amount of time after the vibration device 411 vibrates along the z axis, a vibration effect may be provided in a direction parallel to the x axis.

According to another embodiment, when the vibration device 413 vibrates along the x axis within a predetermined amount of time after the vibration device 421 vibrates along the x axis, a vibration effect may be provided in a direction parallel to the z axis.

According to an embodiment, FIG. 4 illustrates that each of the electronic device 101 and the HMD 103 includes two vibration devices, but is not limited thereto. For example, the electronic device 101 or the HMD 103 may include two or more vibration devices.

According to an embodiment, for convenience of description, it is assumed that the vibration device 411 and the vibration device 423 vibrate along the z axis and the vibration device 421 and the vibration device 413 vibrate along the x axis, but the present disclosure is not limited thereto. For example, the vibration device 411 and the vibration device 423 may vibrate along the x axis and thus provide a vibration effect in a direction parallel to the z axis and the vibration device 421 and the vibration device 413 may vibrate along the z axis and thus provide a vibration effect in a direction parallel to the y axis. In another example, the vibration devices 411 to 423 may vibrate along the y axis as well as the x or z axis and thus provide a different direction of the vibration effect.

Figure 5:
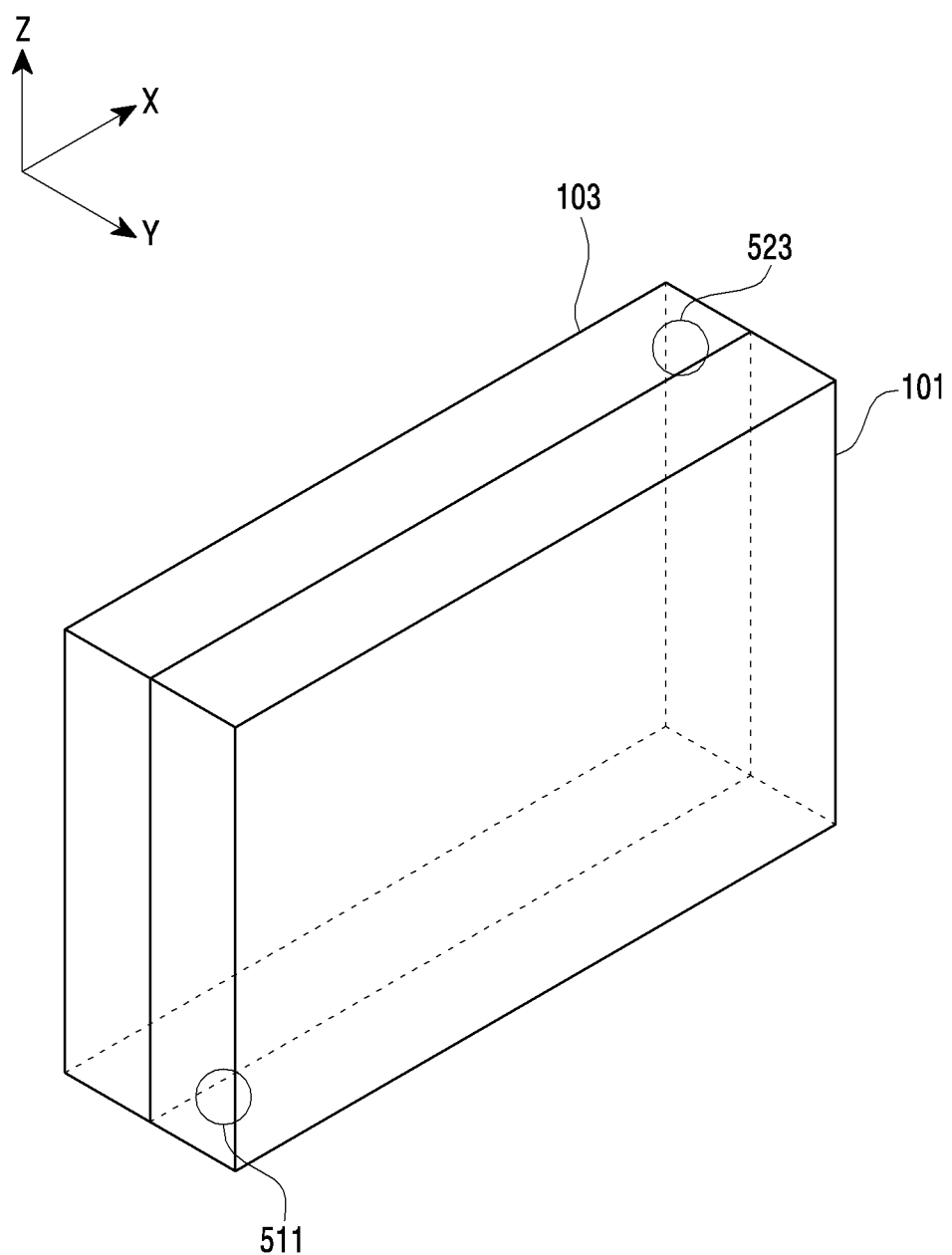
FIG. 5 illustrates a method of providing a vibration effect through the operation of linear vibration devices according to an embodiment of the present disclosure.

FIG. 5 illustrates a method of providing a vibration effect through the operation of linear vibration devices according to an embodiment of the present disclosure.

Referring to FIG. 5, the electronic device 101 may include a vibration device 511 and the HMD 103 may include a vibration device 523. According to an embodiment, the vibration devices 511 and 523 may be linear vibration devices using the vibration power distribution control method.

According to an embodiment, each of the vibration device 511 and the vibration device 523 may correspond to devices which may vibrate along x, y, and z axes. For example, the electronic device 101 may control the vibration device 511 to vibrate along the x, y, or z axes. The electronic device 101 may transmit information related to vibration to the HMD 103 to vibrate the vibration device 523 along the x, y, or z axes.

According to an embodiment, when the vibration device 523 vibrates along the z axis within a predetermined amount of time after the vibration device 511 vibrates along the z axis, a vibration effect may be provided in a direction parallel to the x axis.

According to another embodiment, when the vibration device 523 vibrates along the x axis within a predetermined amount of time after the vibration device 511 vibrates along the x axis, a vibration effect may be provided in a direction parallel to the z axis.

According to an embodiment, FIG. 5 illustrates that each of the vibration devices 511 and 523 is a vibration device which may vibrate along three axes, but the present disclosure is not limited thereto. For example, when the electronic device 101 includes separate vibration devices vibrating along different axes and the HMD 103 includes separate vibration devices vibrating along different axes, the embodiment of FIG. 5 may be similarly applied. For example, when the vibration device 511 and the vibration device 523 are vibration devices vibrating along the y axis, the electronic device 101 may further include a vibration device vibrating along the x axis and a vibration device vibrating along the z axis at locations adjacent to (or near) the location of the vibration device 511, and the HMD 103 may further include a vibration device vibrating along the x axis and a vibration device vibrating the z axis in locations adjacent to the location of the vibration device 523.

Figure 6:
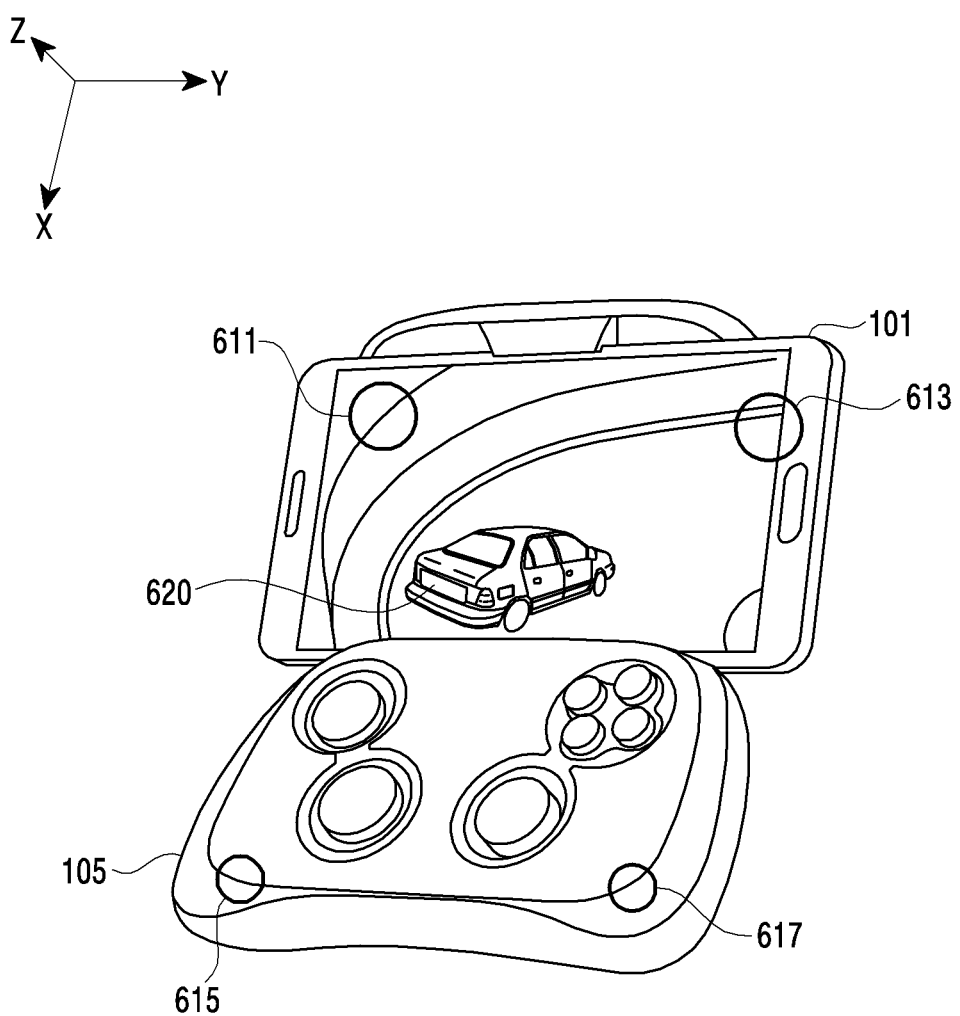
FIG. 6 is a perspective view of an electronic device and an external game pad according to an embodiment of the present disclosure.

FIG. 6 is a perspective view of an electronic device and an external game pad according to an embodiment of the present disclosure.

FIG. 6 may be used to illustrate a method by which the electronic device 101 and a game pad 105 provide vibration together when the electronic device 101 is mounted to the game pad 105. The game pad 105 may be a game controller.

According to an embodiment, the electronic device 101 may include vibration devices 611 and 613, and the game pad 105 may include vibration devices 615 and 617. FIG. 6 illustrates that each of the electronic device 101 and the game pad 105 includes two vibration devices, but each of the electronic device 101 and the game pad 105 may include one or three or more vibration devices. Hereinafter, it is assumed that the vibration devices 611 and 617 are linear vibration devices using the vibration power distribution control method which vibrate along the y axis and the vibration devices 613 and 615 are linear vibration devices using the vibration power distribution control method which vibrate along the x axis.

According to an embodiment, the electronic device 101 may communicate with the game pad 105 through the communication module 190 when the electronic device 101 is mounted to the game pad 105. According to an embodiment, the electronic device 101 may transmit information related to vibration to the game pad 105 so that the game pad 105 vibrates vibration devices 615 and 617 included in the game pad 105.

According to an embodiment, the electronic device 101 may control at least some of the vibration devices to output a vibration effect having a direction at least partially on the basis of content to be output. According to an embodiment, when content includes a moving object 620, the electronic device 101 may control at least some of the vibration devices to output a vibration effect corresponding to the movement (or motion) of the moving object 620. For example, when the moving object 620 moves in a direction parallel to the X axis (or a −X axis direction), the electronic device 101 may provide a vibration effect having the direction parallel to the X axis by vibrating the vibration device 611 within a predetermined amount of time after vibrating the vibration device 617 while the moving object 620 is displayed. In another example, when the moving object 620 moves in a direction parallel to the Y axis (or a −Y axis direction), the electronic device 101 may provide a vibration effect having the direction parallel to the Y axis by vibrating the vibration device 615 within a predetermined amount of time after vibrating the vibration device 613 while the moving object 620 is displayed.

According to an embodiment, when the content includes a sound, the electronic device 101 may output a vibration effect at least partially on the basis of the sound. For example, when the sound to be output is has a directivity in the direction parallel to the X axis (or the −X axis direction), the electronic device 101 may provide a vibration effect having the direction parallel to the X axis by vibrating the vibration device 611 within a predetermined amount of time after vibrating the vibration device 617 while the sound is output in accordance with the direction of the sound.

Figure 7A:
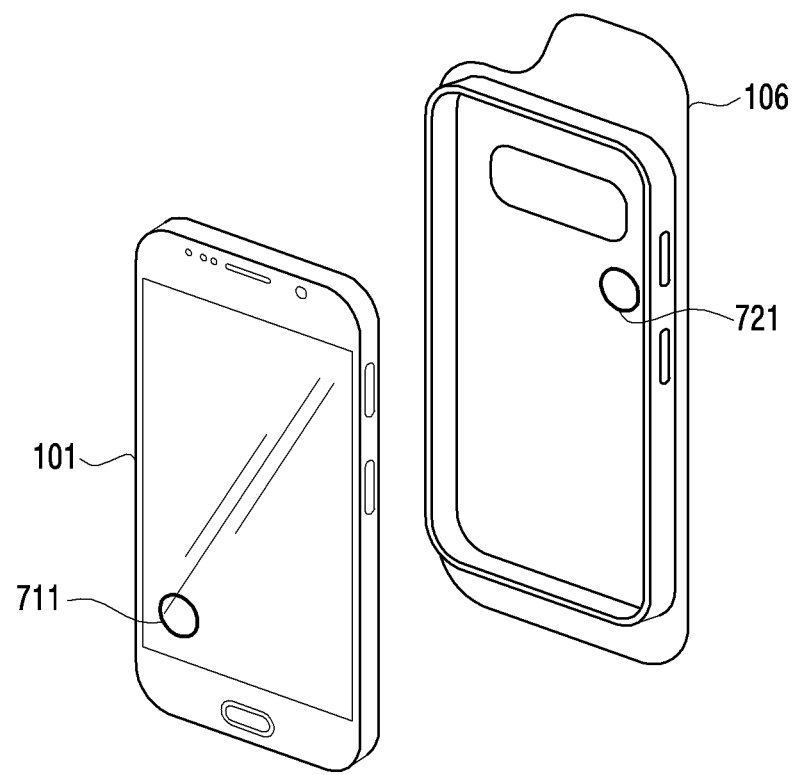
FIG. 7A is a perspective view of an electronic device and an external cover according to an embodiment of the present disclosure.
Figure 7B:
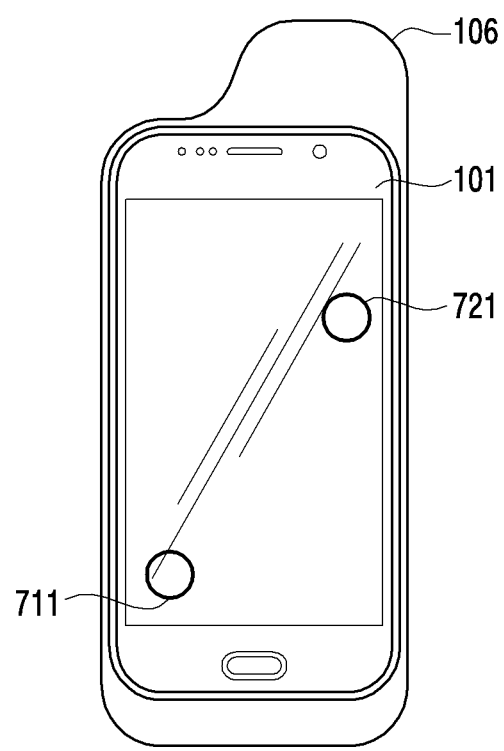
FIG. 7B is a plan view of the electronic device and the external cover of FIG. 7A.

FIG. 7A is a perspective view of an electronic device and an external cover according to an embodiment of the present disclosure. FIG. 7B is a plan view of the electronic device and the external cover of FIG. 7A.

Referring to FIGS. 7A and 7B, FIG. 7A illustrates the state before the electronic device 101 is mounted to the cover 106 and FIG. 7B illustrates the state after the electronic device 101 is mounted to the cover 106.

According to an embodiment, when the electronic device 101 is mounted to the cover 106, the electronic device 101 may provide vibration together with the cover 106.

According to an embodiment, the electronic device 101 may include a vibration device 711 and the cover 106 may include a vibration device 721. FIG. 7 illustrates that each of the electronic device 101 and the cover 106 includes one vibration device, but each of the electronic device 101 and the cover 106 may include two or more vibration devices.

According to an embodiment, the electronic device 101 may communicate with the cover 106 through the communication module 190 when the electronic device 101 is mounted to the cover 106. According to an embodiment, the electronic device 101 may transmit information related to vibration to the cover 106 through the communication module 190 so that the cover 106 vibrates the vibration device 721 included in the cover 106.

According to an embodiment, since the method by which the electronic device 101 and the cover 106 provide vibration together is similar to at least some of the method described with reference to FIGS. 1 to 6, detailed description thereof will be omitted.

Figure 8:
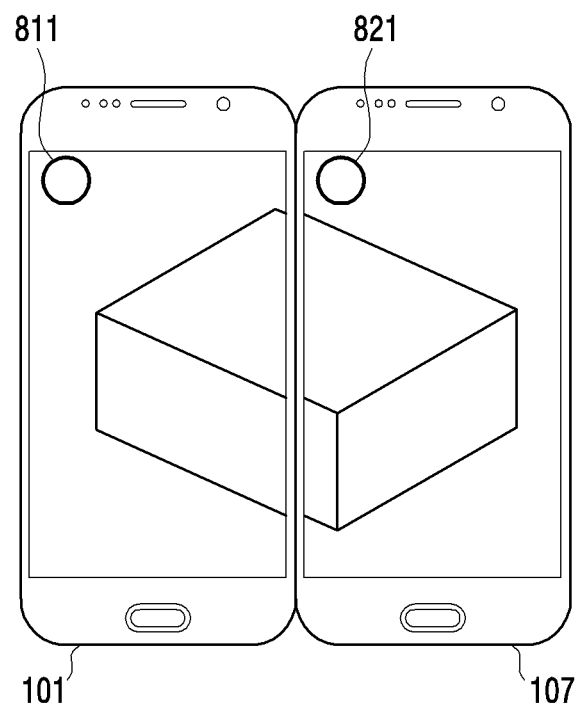
FIG. 8 is a plan view of a plurality of electronic devices provides vibration according to an embodiment of the present disclosure.

FIG. 8 is a plan view of a plurality of electronic devices provides vibration according to an embodiment of the present disclosure.

Referring to FIG. 8, when an external device 107 is an electronic device the same as or similar to the electronic device 101, the electronic device 101 may provide vibration together with the external device 107.

According to an embodiment, the electronic device 101 may include a vibration device 811 and the external device 107 may include a vibration device 821. FIG. 8 illustrates that each of the electronic device 101 and the external device includes one vibration device, but each of the electronic device 101 and the external device may include two or more vibration devices.

According to an embodiment, the electronic device 101 may be located close to the external device 107. According to another embodiment, although not illustrated in FIG. 8, the electronic device 101 may be located close to the external device 107 by a device which may bound the electronic device 101 and the external device 107 together, for example a holder that holds two electronic devices.

According to an embodiment, when the electronic device 101 is located close to the external device 107, the electronic device 101 may communicate with the external device 107 through the communication module 190. According to an embodiment, the electronic device 101 may transmit information related to vibration to the external device 107 through the communication module 190 so that the external device 107 vibrates a vibration device 821 included in the external device 107.

According to an embodiment, the electronic device 101 may output at least one piece of content together with the external device 107. For example, each of the electronic device 101 and the external device 107 may display portions of one image. However, the present disclosure is not limited thereto. The electronic device 101 may provide a vibration effect having a direction through vibration of the vibration device 811 and the vibration device 821 while each of the electronic device 101 and the external device 107 displays portions of the one image.

According to an embodiment, since the method by which the electronic device 101 and the external device 107 provide vibration together is similar to at least some of the method described with reference to FIGS. 1 to 7, detailed description thereof will be omitted.

An electronic device according to an embodiment of the present disclosure includes: a communication interface; at least one first vibration device; and a processor, wherein the processor determines vibration information including a first time for vibrating the at least one first vibration device and a second time for vibrating at least one second vibration device included in an external device to which the electronic device is mounted, based at least partially on information included in content to be outputted by the electronic device, transmits at least part of the vibration information to the external device such that the external device vibrates the at least one second vibration device based at least partially on the second time through the communication interface, and controls the at least one first vibration device to vibrate based at least partially on the first time while the content is output.

According to an embodiment, the processor may detect that the electronic device is mounted to the external device and receive information related to the at least one second vibration device from the external device through the communication circuit.

According to an embodiment, the content may be acquired from an external electronic device or through at least one of a camera or a microphone included in the electronic device, and the processor may output the content in real time. According to an embodiment, the content may include at least one of an image and a sound.

According to an embodiment, when the image includes a moving object, the processor may determine the first time and the second time based on a movement of the moving object.

According to an embodiment, the apparatus may further include a plurality of speakers, wherein the processor may determine the first time and the second time such that the at least one first vibration device and the at least one second vibration device are sequentially vibrated based on a sequence of the sound output from the plurality of speakers, wherein a location of the at least one first vibration device and a location of the at least one second vibration device respectively correspond to locations of the plurality of speakers.

According to an embodiment, when the image contains an image area displayed according to a Point Of View (POV) of a user, the processor may, when the image area which are currently displayed does not include a moving object, determine the first time and the second time for vibrating the electronic device and the external device in a direction from the image area to an image area of the image including the moving object, based at least partially on the sound.

According to an embodiment, the processor may control a display device to display a visual object corresponding the sound.

According to an embodiment, the vibration information may further include at least one of lengths of time during which the at least one first vibration device and the at least one second vibration device vibrate, a magnitude of vibration, and a frequency of vibration.

According to an embodiment, the processor may determine the first time and the second time, based at least partially on directivity of a beam of the sound.

According to an embodiment, the external device may include a Head-Mounted Device (HMD), a game pad, a cover, or another electronic device.

Figure 9:
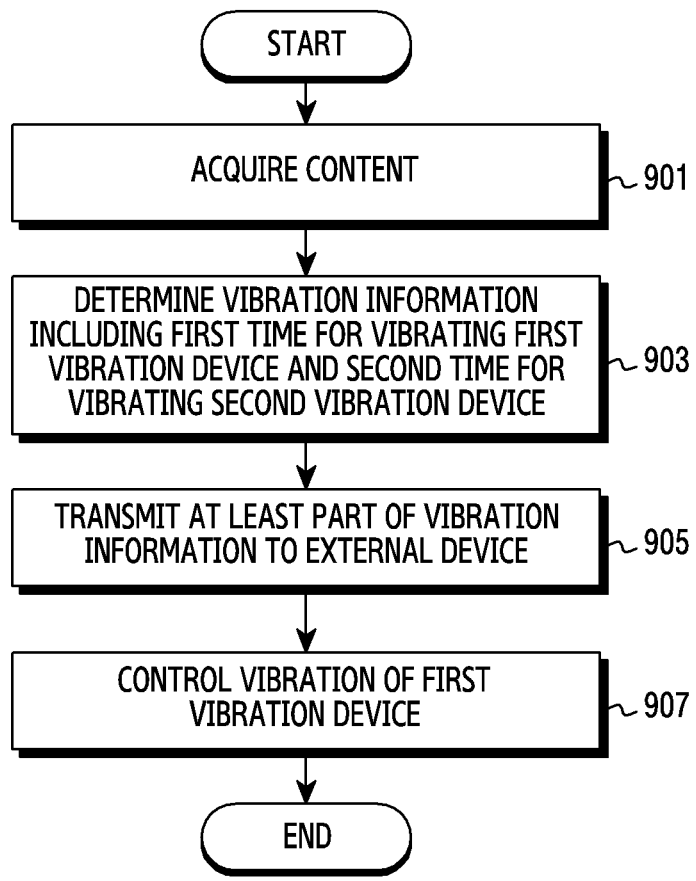
FIG. 9 is a flowchart illustrating a method of providing vibration according to an embodiment of the present disclosure.

FIG. 9 is a flowchart illustrating a method of providing vibration according to an embodiment of the present disclosure.

Referring to FIG. 9, the electronic device 101 may acquire content in operation 901.

According to an embodiment, the processor 120 may control the communication module 190 to acquire content from an external electronic device (for example, an external server or an external camera). According to an embodiment, the processor 120 may control the communication module 190 or the input device 150 (for example, a microphone) to acquire content. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101

According to an embodiment, the content may include content to be output in real time. According to an embodiment, the content may include content previously stored in the memory 130.

According to an embodiment, the content may include at least one of an image and a sound. According to an embodiment, the image may include a still image or a moving image. According to an embodiment, the sound may include a mono sound or a stereo sound. However, the present disclosure is not limited thereto.

In operation 903, the processor 120 may determine (or generate) vibration information including a first time for vibrating at least one first vibration device 210 and a second time for vibrating at least one second vibration device 220 included in the external device mounted to the electronic device 101 at least partially on the basis of information included in the acquired content (or information related to the content).

According to an embodiment, the vibration information may include at least one of a vibration start time of the vibration device, a vibration time length (or a length of time during which the vibration effect is provided), a magnitude of vibration, and a frequency of vibration. According to an embodiment, the vibration information may include at least one piece of first vibration information for vibrating the first vibration device 210 and second vibration information for vibrating the second vibration device 220.

According to an embodiment, the processor 120 may determine at least one piece of the first vibration information and the second vibration information at least partially on the basis of the image in the content. For example, when the image to be output is a moving image and the moving image includes a moving object, the processor 120 may determine the first vibration information and the second vibration information corresponding to movement of the moving object.

According to an embodiment, when the image to be output is a moving image and the moving image includes a moving object, the processor 120 may determine a first time for vibrating the first vibration device 210 and a second time for vibrating the second vibration device 220 in accordance with a movement direction of the moving object. For example, when the moving object moves from a first area within the image to a second area, the processor 120 may determine a start time for vibrating the first vibration device 210 and a start time for vibrating the second vibration device 220 such that, for example, the second vibration device 220 positioned at a location corresponding to the second area starts vibration within a predetermined amount of time after the first vibration device 210 positioned at a location corresponding to the first area within the image starts vibration.

According to an embodiment, the processor 120 may determine a time period in which the first vibration device 210 and the second vibration device 220 vibrate or the magnitude of vibration at least partially on the basis of a movement speed of the moving object. For example, as the movement speed of the moving object increases, the processor 120 may determine the time period for the vibration to be shorter and the magnitude of vibration to be larger. However, the present disclosure is not limited thereto.

According to an embodiment, the processor 120 may determine the time period in which the first vibration device 210 and the second vibration device 220 vibrate at least partially on the basis of a movement length of the moving object. For example, the processor 120 may determine the time period to be longer when the length of the movement of the moving object is longer. However, the present disclosure is not limited thereto.

According to an embodiment, the processor 120 may determine the magnitude of vibration of the first vibration device 210 and the second vibration device 220 at least partially on the basis of a direction in which the moving object moves. For example, when the moving object moves from a first area within the image to a second area, the processor 120 may determine the magnitude of vibration of the first vibration device 210 positioned at a location corresponding to the first area to gradually decrease, while the magnitude of vibration of the second vibration device 220 positioned at a location corresponding to the second area gradually increases. However, the present disclosure is not limited thereto.

According to an embodiment, the processor 120 may determine at least one piece of first vibration information and second vibration information at least partially on the basis of a sound. For example, when the sound to be output is a sound having directivity, the processor 120 may determine at least one piece of the first vibration information and the second vibration information at least partially on the basis of the direction of the sound.

According to an embodiment, the processor 120 may determine a start time for vibrating the first vibration device 210 and a start time for vibrating the second vibration device 220 at least partially on the basis of a change in the direction of the sound. For example, when the direction of the sound is changed from a first direction to a second direction, the processor 120 may determine a start time for vibrating the first vibration device 210 and a start time for vibrating the second vibration device 220 such that, for example, the second vibration device 220 positioned at a location corresponding to the second direction starts vibration within a predetermined amount of time after, for example, the first vibration device 210 positioned at a location corresponding to the first direction starts vibration. According to an embodiment, the electronic device 101 may include a plurality of speakers including a first speaker and a second speaker. A first sound through the first speaker located in the left of the electronic device 101 may be first output, and afterwards within a predetermined amount of time a second sound corresponding to the first sound through the second speaker located in the right of the electronic device 101 may be output. In this case, the electronic device 101 may determine a start time for vibrating the first vibration device 210 and a start time for vibrating the second vibration device 220 such that the second vibration device 220 positioned at a location corresponding to the location of the second speaker vibrates after the first vibration device 210 positioned at a location corresponding to the location of the first speaker vibrates. However, the present disclosure is not limited thereto.

According to an embodiment, the processor 120 may determine a length of time during which the first vibration device 210 and the second vibration device 220 vibrate at least partially on the basis of time during which the sound is output. For example, the processor 120 may determine the length of time during which the first vibration device 210 and the second vibration device 220 vibrate such that the length of time during which the first vibration device 210 and the second vibration device 220 vibrate corresponds to the length of the outputted sound. However, the present disclosure is not limited thereto.

According to an embodiment, the processor 120 may determine the magnitude (amplitude) of vibration of the first vibration device 210 and the second vibration device 220 at least partially on the basis of the volume of the sound. For example, the processor 120 may determine the magnitude of vibration of the first vibration device 210 and the second vibration device 220 such that the magnitude of vibration of the first vibration device 210 and the second vibration device 220 correspond to the volume of the sound. However, the present disclosure is not limited thereto.

According to an embodiment, the processor 120 may determine the frequency in which the first vibration device 210 and the second vibration device 220 vibrate at least partially on the basis of the frequency of the sound. For example, the processor 120 may determine a higher frequency in which the first vibration device 210 and the second vibration device 220 vibrate if the frequency of the sound is higher. However, the present disclosure is not limited thereto.

According to an embodiment, the processor 120 may determine vibration information at least partially on the basis of the image and the sound in the content to be output.

According to an embodiment, when content to be output includes a sound and an image, the processor 120 may determine vibration information in consideration of both sound and image, but sound may take precedence. For example, when the vibration information determined at least partially on the basis of the sound is different from the vibration information determined at least partially on the basis of the image, the processor 120 may determine the vibration information determined at least partially on the basis of the sound as the vibration information.

According to an embodiment, the processor 120 may determine a part of the vibration information at least partially on the basis of the sound and determine another part of the vibration information at least partially on the basis of the image. For example, the processor 10 may determine a length of time during which the vibration device vibrates, a magnitude of vibration, and a frequency of vibration at least partially on the basis of the sound and determine a vibration start time at least partially on the basis of the image. However, the present disclosure is not limited thereto.

According to an embodiment, when an image and a sound are acquired in real time through the camera module 180 and a microphone, the processor 120 may identify whether the image does not include a moving object but the acquired sound has a direction. When it is identified that the image does not include the moving object but the sound has the direction, the processor 120 may determine vibration information for providing a vibration effect in a direction corresponding to the direction of the sound. According to an embodiment, when it is identified that the image does not include a moving object but the sound has the direction, the processor 120 may generate a visual object inducing the user to change the direction of the electronic device 101 (or the camera module 180) to the direction of the sound. However, the present disclosure is not limited thereto.

According to an embodiment, although not illustrated in FIG. 9, when the number of at least one of the first vibration device 210 and the second vibration device 220 is plural, the processor 120 may determine a vibration device to be driven on the basis of at least part of the content to be output, the location of the vibration device, and the vibration direction of the vibration device.

In operation 905, the processor 120 may transmit at least part of the vibration information to an external device through the communication module 190.

For example, the processor 120 may transmit second vibration information to the external device through the communication module 190. Although not illustrated in FIG. 9, the external device may vibrate the second vibration device 220 at least partially on the basis of the received second vibration information. For example, the external device may vibrate the second vibration device 220 at least partially on the basis of the part of information on the vibration start time of the second vibration device 220, the length of time during which the vibration device vibrates, the magnitude of vibration, and/or the frequency of vibration.

In another example, the processor 120 may transmit first vibration information and second vibration information to the external device through the communication module 190. Although not illustrated in FIG. 9, when the external device receives the first vibration information and the second vibration information from the electronic device 101, the external device may vibrate the second vibration device 220 at least partially on the basis of the second vibration information.

In operation 907, the processor 120 may control the first vibration device 210 to vibrate at least partially on the basis of the first vibration information while content is output. For example, the processor 120 may control the first vibration device 210 to vibrate at least partially on the basis of the first vibration information along with the output of the acquired content. Although not illustrated in FIG. 9, the processor 120 may synchronize a time at which the content is output with a time at which the first vibration device 210 vibrates.

According to an embodiment, the processor 120 may identify a time at which the moving object is output and control the first vibration device 210 to output a vibration effect corresponding to a movement direction of the moving object at the time at which the moving object is output. According to an embodiment, the processor 120 may identify a time at which the sound is output and control the first vibration device 210 to output a vibration effect corresponding to the sound direction of the sound at the time at which the sound is output.

According to an embodiment, when the image and the sound are acquired in real time through the camera module 180 and the microphone and it is identified that the image does not include a moving object but the sound has a direction, the processor 120 may control the display device 160 to display a visual object for inducing the user to change the direction of the electronic device 101 (or the camera module 180) to the direction of the sound.

Figure 10:
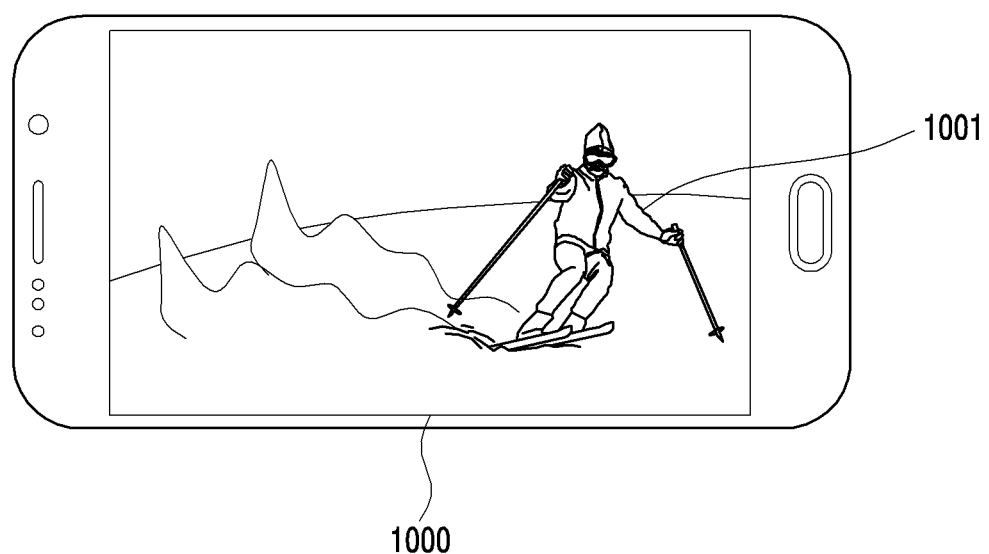
FIG. 10 is a plan view of an electronic device illustrating a method of providing vibration according to an embodiment of the present disclosure.

FIG. 10 is a plan view of an electronic device illustrating a method of providing vibration according to an embodiment of the present disclosure.

Referring to FIG. 10, the electronic device 101 may be mounted to an external device (for example, the HMD 103). According to an embodiment, the electronic device 101 may provide a vibration effect corresponding to movement of the moving object 1001 while the image 1000 is output. For example, the electronic device 101 may vibrate the second vibration device 220 located near the right of the image after vibrating the first vibration device 210 located near the left of the image while the moving object 1001 moves from the left to the right of the image. Similarly, the electronic device 101 may vibrate the first vibration device 210 located near the left of the image after vibrating the second vibration device 220 located near the right of the image while the moving object 1001 moves from the right to the left of the image. However, the present disclosure is not limited thereto.

Figure 11A:
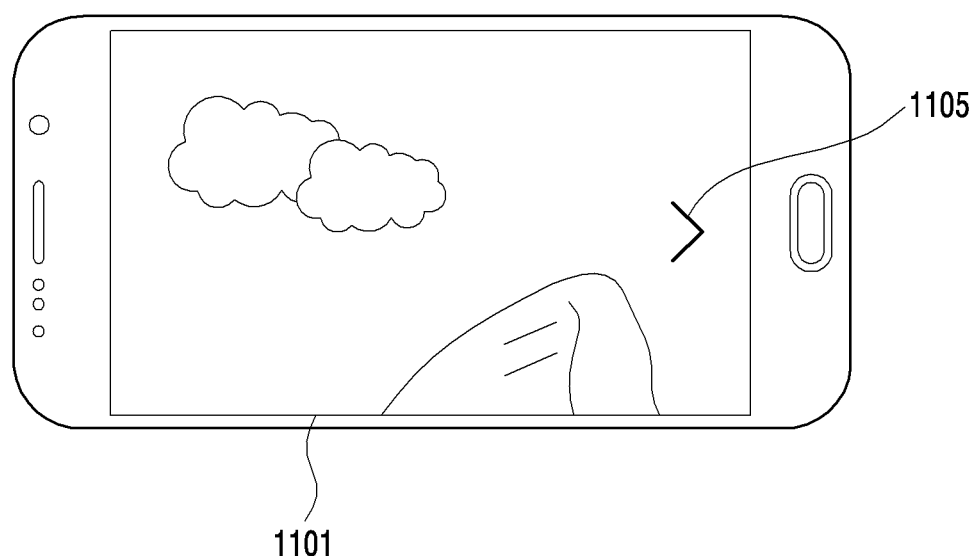
FIG. 11A, FIG. 11B and FIG. 11C are plan views of an electronic device illustrating a method of providing vibration according to an embodiment of the present disclosure.
Figure 11B:
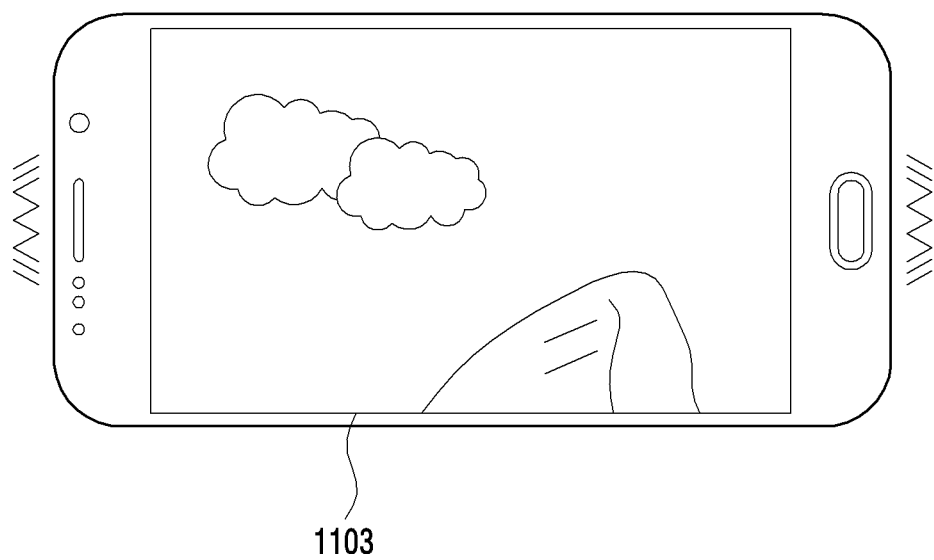
Figure 11C:
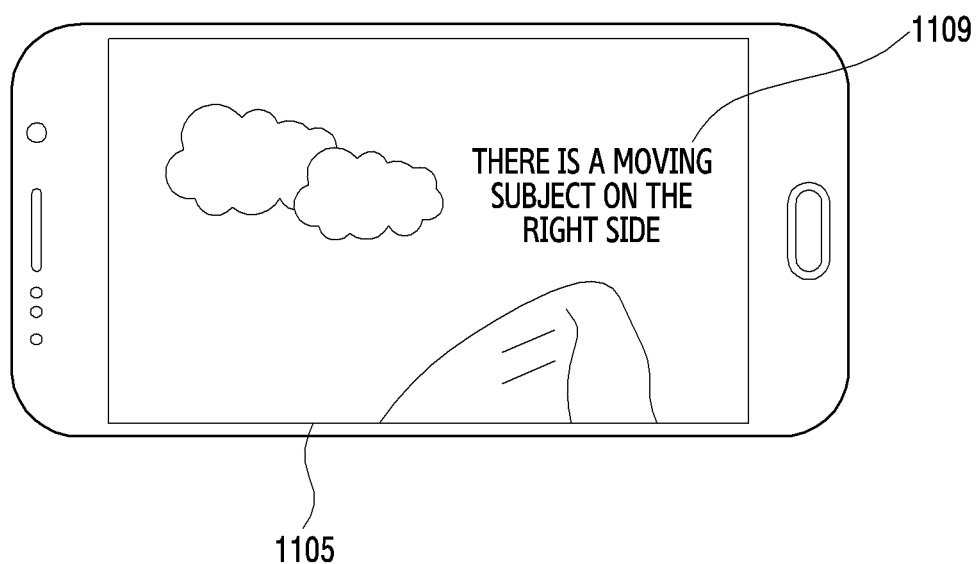

FIGS. 11A to 11C are plan views of an electronic device illustrating a method of providing vibration according to an embodiment of the present disclosure.

FIGS. 11A to 11C illustrate screens displayed when an image does not include a moving object but a sound has a direction while the image and the sound acquired through the camera module 180 and the microphone are output in real time.

According to an embodiment, when it is identified that the image does not include the moving object but directivity provided to the user by the output of the sound corresponds to the right side of the user, the electronic device 101 may display a visual object 1105 for inducing the user to change the direction of the electronic device 101 towards the right as illustrated in FIG. 11A. However, the present disclosure is not limited thereto. According to an embodiment, while the visual object 1105 is displayed as illustrated in FIG. 11A, the electronic device 101 may control the first vibration device 210 and the second vibration device 220 to provide a vibration effect having a direction from the left to the right of the image 1101.

According to another embodiment, as illustrated in FIG. 11B, without the output of the visual object 1105 illustrated in FIG. 11A, the electronic device 101 may control the first vibration device 210 and the second vibration device 220 to provide a vibration effect for inducing the user to change the direction of the electronic device 101 to the right. For example, when it is identified that the image does not include the moving object but directivity provided to the user by the output of the sound corresponds to the right side of the user, the electronic device may first vibrate the first vibration device 210 corresponding the left part of the image 1103 and then vibrate the second vibration device 220 corresponding to the right part of the image 1103 within a predetermined amount of time as illustrated in FIG. 11B.

According to another embodiment, when it is identified that the image does not include the moving object but directivity provided to the user by the output of the sound corresponds to the right side of the user, the electronic device 101 may display text 1109, such as "there is a moving subject on the right side," for inducing the user to change the direction of the electronic device 101 to the right as illustrated in FIG. 11C. However, the present disclosure is not limited thereto.

Figure 12:
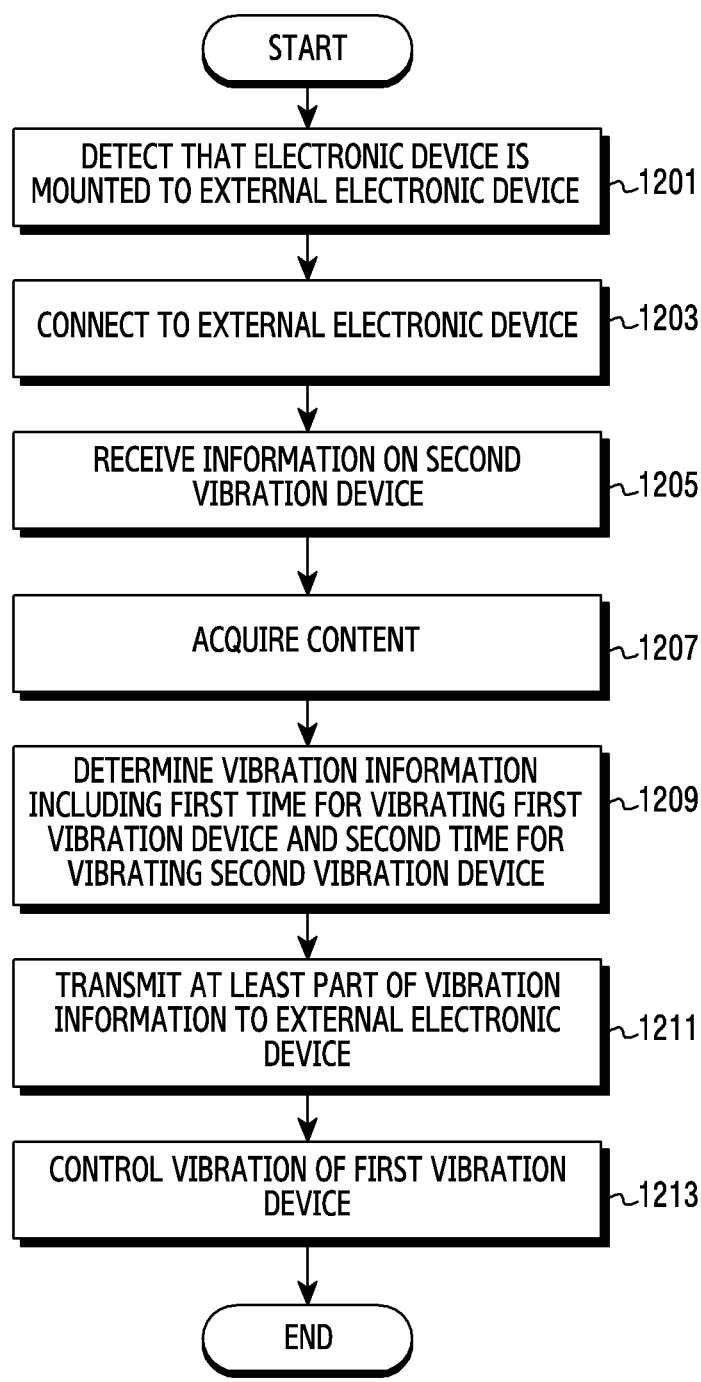
FIG. 12 is a flowchart illustrating a method of providing vibration according to an embodiment of the present disclosure.

FIG. 12 is a flowchart illustrating a method of providing vibration according to an embodiment of the present disclosure.

In operation 1201, the processor 120 may detect that the electronic device 101 is mounted to the external device.

According to an embodiment, the processor 120 may detect that the electronic device 101 is mounted to the HMD 103. For example, the processor 120 may detect that the electronic device is mounted to the HMD 103 by detecting the connection between a connector of the electronic device 101 and a connector 240 of the HMD 103. However, the present disclosure is not limited thereto.

However, when the external device 107 is a device the same as or similar to the electronic device 101 as illustrated in FIG. 8, operation 1201 may be omitted.

In operation 1203, the processor 120 may control the communication module 190 to connect the electronic device 101 to the external device.

According to an embodiment, the processor 120 may allow the electronic device 101 to communicate with the external device through a wire (for example, a wire having a Universal Serial Bus (USB) connector) or wirelessly (for example, Bluetooth).

According to an embodiment, FIG. 12 illustrates that operation 1201 is performed earlier than operation 1203, but operation 1201 in which the external device is detected may be performed after operation 1203 in which communication is connected.

In operation 1205, the processor 120 may receive information on the second vibration device 220 included in the external device through the communication module 190.

For example, through the communication module 190, the processor 120 may receive information on a location of the second vibration device 220 within the external device and information on an axis (or a vibration direction) along which the second vibration device 220 vibrates when the second vibration device 220 is a linear vibration device.

According to an embodiment, when the external device includes a plurality of second vibration devices 220, the processor 120 may receive information on a location of each of the plurality of second vibration devices 220 and information on an axis along which each of the plurality of second vibration devices 220 vibrate through the communication module 190.

In operation 1207, the electronic device 101 may acquire content. FIG. 12 illustrates that operation 1207 for acquiring content is performed after operations 1201 to 1205, but is not limited thereto. For example, operation 1207 for acquiring content may be performed before one of operations 1201 to 1205.

Since operations 1207 to 1213 are the same as or similar to at least some of operations 901 to 907 of FIG. 9, detailed description thereof will be omitted.

Figure 13:
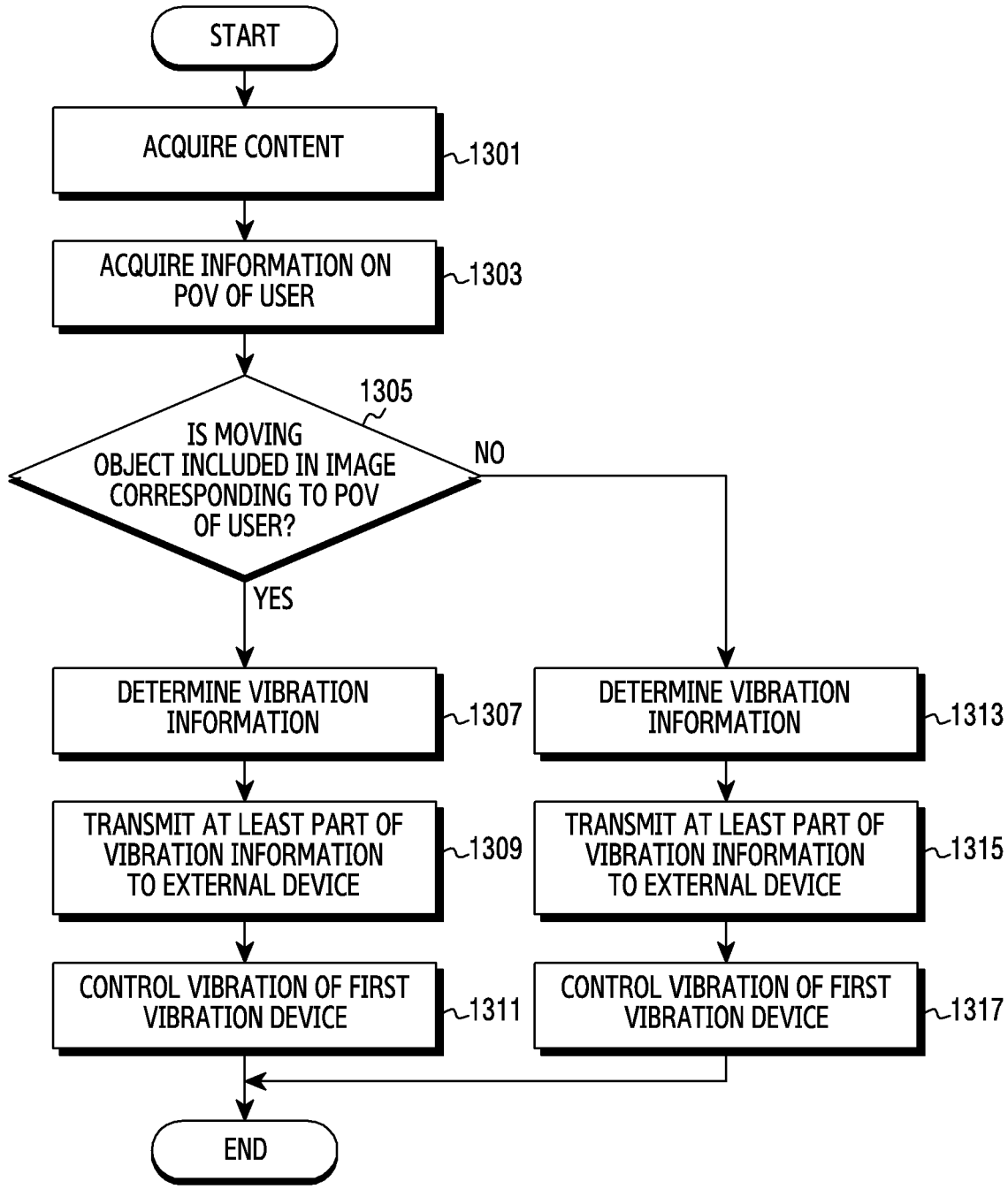
FIG. 13 is a flowchart illustrating a method of providing vibration according to an embodiment of the present disclosure.

FIG. 13 is a flowchart illustrating a method of providing vibration according to an embodiment of the present disclosure.

Figure 14A:
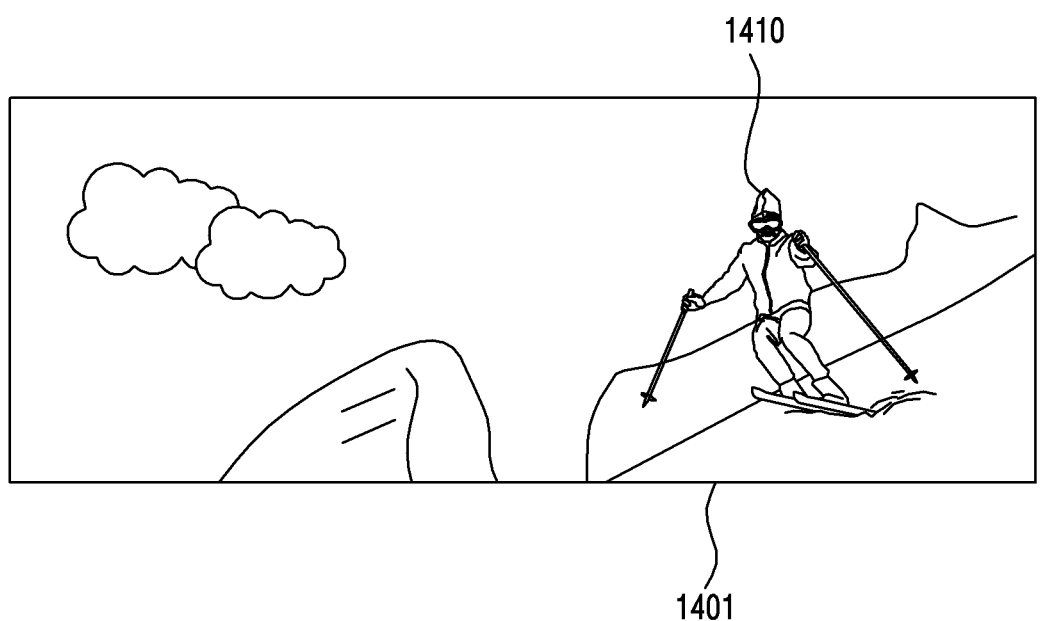
FIG. 14A, FIG. 14B, and FIG. 14C are views illustrating a method of providing vibration according to an embodiment of the present disclosure.
Figure 14B:
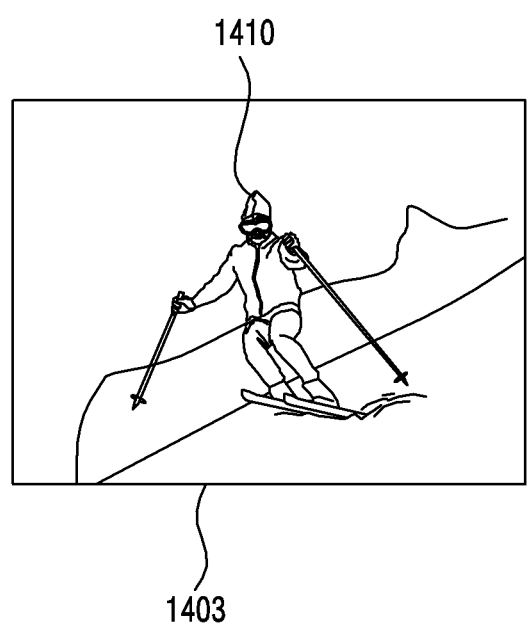
Figure 14C:
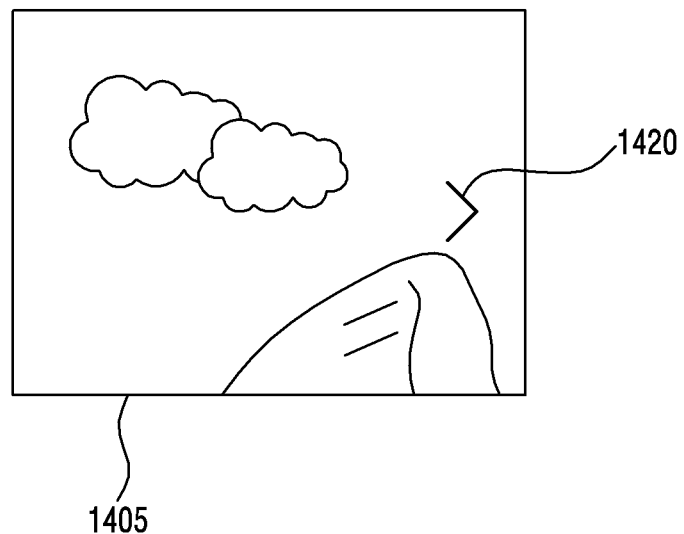

FIGS. 14A to 14C are views illustrating a method of providing vibration according to an embodiment of the present disclosure.

For example, FIGS. 13 and 14A to 14C illustrate a method of providing vibration when content to be output by the electronic device 101 includes an image, such as a 360-degree forward image (hereinafter, referred to as an "entire image") of which an image area (or part thereof) is displayed according to a POV of the user.

Referring to FIGS. 13 and 14A to 14C, in operation 1301, the electronic device 101 may acquire content, for example, content including the entire image.

According to an embodiment, the processor 120 may control the communication module 190 to acquire content including the entire image from an external electronic device (for example, an external server or an external camera that acquire the forward image). According to an embodiment, the processor 120 may control at least one of the camera module 180 and the input device 150 (for example, a microphone) to acquire content.

According to another embodiment, the processor 120 may acquire content including the entire image in real time from an external camera. According to an embodiment, the processor 120 may acquire a sound in real time through a microphone while the entire image is acquired from the external camera.

In operation 1303, the processor 120 may acquire information on the POV of the user. For example, when the electronic device 101 is mounted to an external device such as the HMD 103, the processor 120 may acquire information on the POV of the user at least partially on the basis of information on the direction of the electronic device 101 or the direction of the external device.

In operation 1305, the processor 120 may determine whether a moving object 1410 is included in the image corresponding to the POV of the user at least partially on the basis of the acquired content and the information on the POV of the user.

According to an embodiment, when the entire image is an image 1401 as illustrated in FIG. 14A, the electronic device 101 may display an image 1403 including a moving object 1410 or an image 1405 which does not include a moving object as illustrated in FIGS. 14B and 14C according to the POV of the user (or a change in the POV of the user). For example, when the image corresponding to the POV of the user is the image 1401 or 1403, the processor 120 may determine that the moving object 1410 is included in the image corresponding to the POV of the user. In another example, when the image corresponding to the POV of the user is the image 1405, the processor 120 may determine that the moving object is not included in the image corresponding to the POV of the user.

When it is determined that the moving object is included in the image corresponding to the POV of the user in operation 1305, the processor 120 may determine vibration information for providing a vibration effect corresponding to movement of the moving object in operation 1307.

In operation 1309, the processor 120 may transmit at least part of the vibration information to an external device through the communication module 190.

In operation 1311, the processor 120 may control the first vibration device 210 to vibrate at least partially on the basis of the first vibration information while content is output.

Since operations 1307 to 1311 are the same as or similar to at least part of operations 903 to 907 of FIG. 9, detailed description thereof will be omitted.

When it is determined that the moving object is not included in the image corresponding to the POV of the user in operation 1305, the processor 120 may determine vibration information at least partially on the basis of a sound included in content in operation 1313.

According to an embodiment, when it is determined that the moving object is included in the entire image but is not included in the image corresponding to the POV of the user and it is identified that the sound has a direction, the processor 120 may determine vibration information for providing a vibration effect in a direction corresponding to the direction of the sound.

According to an embodiment, when it is determined that the moving object is included in the entire image but is not included in the image corresponding to the POV of the user and it is identified that the sound has the direction, the processor 120 may generate a visual object for inducing the user to change the POV of the user in accordance with the direction of the sound.

In operation 1315, the processor 120 may transmit at least part of the vibration information to an external device through the communication module 190.

In operation 1317, the processor 120 may control the first vibration device 210 to vibrate at least partially on the basis of first vibration information generated in operation 1313. In addition, the processor 120 may display a visual object 1420 shown in FIG. 14C and whose operations are described in detail in connection with FIGS. 11A and 11C.

Figure 15:
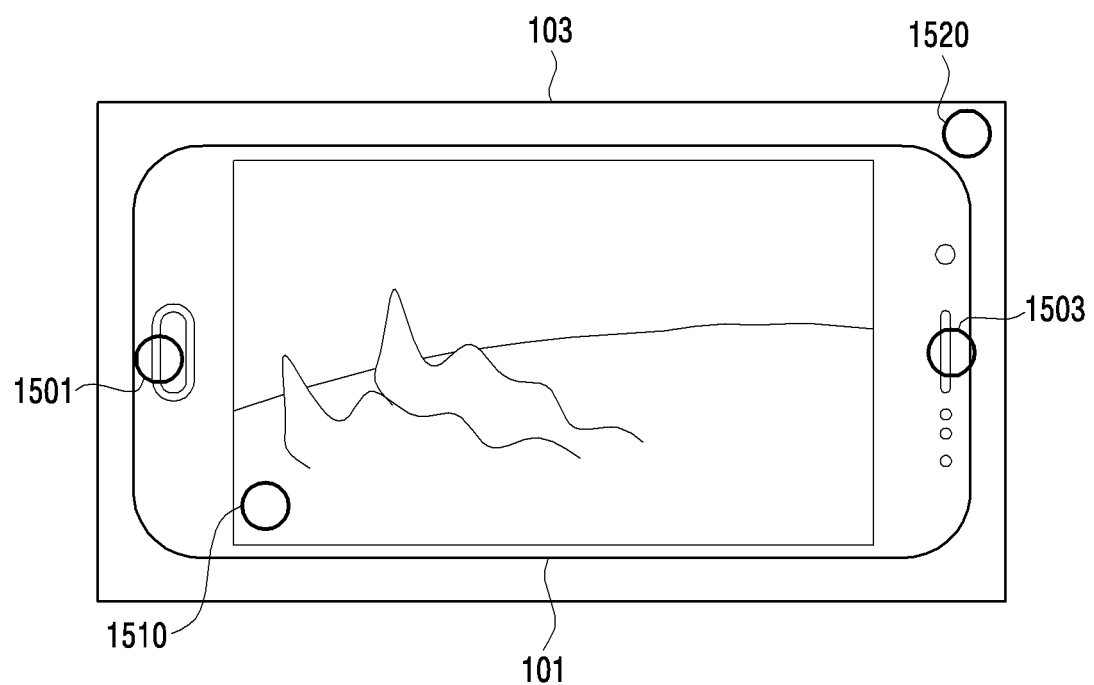
FIG. 15 is a plan view of an electronic device illustrating a method of providing vibration according to an embodiment of the present disclosure.

FIG. 15 is a plan view of an electronic device illustrating a method of providing vibration according to an embodiment of the present disclosure.

FIG. 15 may illustrate a method of providing a vibration effect at least partially on the basis of the sound output from a plurality of speakers when the electronic device 101 includes the plurality of speakers, for example, a first speaker 1501 and a second speaker 1503.

According to an embodiment, when a second sound is output through the second speaker 1503 located in the right side of the electronic device 101 within a predetermined amount of time after a first sound is output through the first speaker 1501 located in the left side of the electronic device 101, the electronic device 101 may vibrate a vibration device 1520 included in the HMD 103 with a predetermined amount of time after vibrating a vibration device 1510 while the sound is output in order to provide the user with a direction of the vibration effect from left to right.

However, while FIG. 15 illustrates that the sound is output through the plurality of speakers, the present disclosure is not limited thereto. For example, when the electronic device 101 includes a single speaker and the sound to be output has left to right directivity, the electronic device 101 may vibrate the vibration device 1520 and then vibrate the vibration device 1510 within a predetermined amount of time after the vibration of the vibration device 1520 while the sound is output. According to an embodiment, when the electronic device 101 includes a single speaker, the electronic device 101 may determine directivity of the sound beam by identifying at least one of a gain and a phase of the sound signal. When the directivity of the beam moves from the left to the right, the electronic device 101 may vibrate the vibration device 1520 while the sound is output and then vibrate the vibration device 1510 within a predetermined amount of time after the vibration of the vibration device 1520.

A method of providing vibration by an electronic device having a communication interface according to an embodiment of the present disclosure includes: an operation of determining vibration information including a first time for vibrating the at least one first vibration device included in the electronic device and a second time for vibrating at least one second vibration device included in an external device to which the electronic device is mounted, based at least partially on information included in content to be outputted by the electronic device; an operation of transmitting at least part of the vibration information to the external device such that the external device vibrates the at least one second vibration device based at least partially on the second time through the communication interface; and an operation of controlling the at least one first vibration device to vibrate based at least partially on the first time while the content is output.

According to an embodiment, the method may further include: an operation of detecting that the electronic device is mounted to the external device; and an operation of receiving information related to the at least one second vibration device from the external device through the communication interface.

According to an embodiment, the content may be acquired from an external electronic device or through at least one of a camera or a microphone included in the electronic device, and the method further includes an operation of outputting the content in real time.

According to an embodiment, the content may include at least one of an image and a sound.

According to an embodiment, when the image includes a moving object, the operation of determining of the vibration information may include an operation of determining the first time and the second time based on a movement of the moving object.

According to an embodiment, the operation of determining the vibration information may include an operation of, when the electronic device includes a plurality of speakers, determining the first time and the second time such that the at least one first vibration device and the at least one second vibration device are sequentially vibrated based on a sequence of the sound output from the plurality of speakers, wherein a location of the at least one first vibration device and a location of the at least one second vibration device respectively correspond to locations of the plurality of speakers.

According to an embodiment, when the image contains an image area displayed according to a Point Of View (POV) of a user, the determining of the vibration information may include an operation of, when the image area which are currently displayed does not include a moving object, determining the first time and the second time for vibrating the electronic device and the external device in a direction from the image area to an image area of the image including the moving object, based at least partially on the sound.

According to an embodiment, the method may further include an operation of controlling a display device to display a visual object corresponding to the sound.

According to an embodiment, the vibration information may further include at least one of lengths of time during which the at least one first vibration device and the at least one second vibration device vibrate, a magnitude of vibration, and a frequency of vibration.

According to an embodiment, the operation of determining the vibration information may include an operation of determining the first time and the second time, based at least partially on directivity of a beam of the sound.

According to an embodiment, the external device may include a head-mounted device, a game pad, a cover, or another electronic device.

Further, a structure of data used in the embodiments of the present disclosure may be recorded in a computer-readable recording medium through various means. The computer-readable recording medium includes a magnetic storage medium (for example, a ROM, a floppy disk, and a hard disk) and an optical reading medium (for example, a CD-ROM and a DVD).

According to an embodiment, the computer-readable recording medium may record programs for executing, in an electronic device, an operation of determining vibration information including a first time for vibrating the at least one first vibration device included in the electronic device and a second time for vibrating at least one second vibration device included in an external device to which the electronic device is mounted, based at least partially on information included in content; an operation of transmitting at least part of the vibration information to the external device such that the external device vibrates the at least one second vibration device, based at least partially on the second time through the communication interface; and an operation of controlling the at least one first vibration device to vibrate, based at least partially on the first time while the content is output.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The present disclosure has been discussed above in connection with the exemplary embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. An electronic device comprising:
a communication interface;
at least one first vibration device; and
a processor,
wherein the processor is configured to:
determine vibration information including a first time for vibrating the at least one first vibration device and a second time for vibrating at least one second vibration device included in an external device to which the electronic device is mounted, based at least partially on information included in content to be outputted by the electronic device, transmit, through the communication interface, at least part of the vibration information to the external device such that the external device vibrates the at least one second vibration device based at least partially on the second time, and control the at least one first vibration device to vibrate based at least partially on the first time while the content is outputted.

2. The electronic device of claim 1, wherein the processor is configured to:

detect that the electronic device is mounted to the external device; and receive information related to the at least one second vibration device from the external device through the communication interface.

3. The electronic device of claim 1, wherein the content is acquired from an external electronic device or through at least one of a camera or a microphone included in the electronic device, and wherein the processor is configured to output the content in real time.

4. The electronic device of claim 1, wherein the content includes at least one of an image and a sound.

5. The electronic device of claim 4, wherein, when the image includes a moving object, the processor is configured to determine the first time and the second time based on a movement of the moving object.

6. The electronic device of claim 4, further comprising a plurality of speakers, wherein the processor is configured to determine the first time and the second time such that the at least one first vibration device and the at least one second vibration device are sequentially vibrated based on a sequence of the sound output from the plurality of speakers, wherein a location of the at least one first vibration device and a location of the at least one second vibration device respectively correspond to lcations of the plurality of speakers.

7. The electronic device of claim 4, wherein, when the image contains an image area displayed according to a Point Of View (POV) of a user, the processor is configured to:

when the image area which are currently displayed does not include a moving object, determine the first time and the second time for vibrating the electronic device and the external device in a direction from the image area to an image area of the image including the moving object, based at least partially on the sound.

8. The electronic device of claim 7, wherein the processor is configured to control a display device to display a visual object corresponding to the direction.

9. The electronic device of claim 4, wherein the vibration information further includes at least one of lengths of time during which the at least one first vibration device and the at least one second vibration device vibrate, a magnitude of vibration, and a frequency of vibration.

10. The electronic device of claim 4, wherein the processor is configured to determine the first time and the second time based at least partially on directivity of a beam of the sound.

11. A method of providing vibration by an electronic device having a communication interface, the method comprising:

determining vibration information including a first time for vibrating the at least one first vibration device included in the electronic device and a second time for vibrating at least one second vibration device included in an external device to which the electronic device is mounted, based at least partially on information included in content to be outputted by the electronic device;

transmitting, through the communication interface, at least part of the vibration information to the external device such that the external device vibrates the at least one second vibration device based at least partially on the second time; and controlling the at least one first vibration device to vibrate based at least partially on the first time while the content is outputted.

12. The method of claim 11, further comprising:

detecting that the electronic device is mounted to the external device; and receiving information related to the at least one second vibration device from the external device through the communication interface.

13. The method of claim 11, wherein the content is acquired from an external electronic device or through at least one of a camera or a microphone included in the electronic device, and the method further comprises outputting the content in real time.

14. The method of claim 11, wherein the content includes at least one of an image and a sound.

15. The method of claim 14, wherein, when the image includes a moving object, the determining of the vibration information comprises determining the first time and the second time based on a movement of the moving object.

16. The method of claim 14, wherein the determining of the vibration information comprises, when the electronic device includes a plurality of speakers, determining the first time and the second time such that the at least one first vibration device and the at least one second vibration device are sequentially vibrated based on a sequence of the sound output from the plurality of speakers, wherein a location of the at least one first vibration device and a location of the at least one second vibration device respectively correspond to locations of the plurality of speakers.

17. The method of claim 14, wherein, when the image contains an image area displayed according to a Point Of View (POV) of a user, the determining of the vibration information comprises:

when the image area which are currently displayed does not include a moving object, determining the first time and the second time for vibrating the electronic device and the external device in a direction from the image area to an image area of the image including the moving object, based at least partially on the sound.

18. The method of claim 17, further comprising controlling a display device to display a visual object corresponding to the sound.

19. The method of claim 14, wherein the vibration information further includes at least one of lengths of time during which the at least one first vibration device and the at least one second vibration device vibrate, a magnitude of vibration, and a frequency of vibration.

20. The method of claim 14, wherein the determining of the vibration information comprises determining the first time and the second time based at least partially on directivity of a beam of the sound.

* * * * *